United States Patent [19]

Hayes et al.

[11] Patent Number: 4,886,519
[45] Date of Patent: Dec. 12, 1989

[54] METHOD FOR REDUCING SOX EMISSIONS DURING THE COMBUSTION OF SULFUR-CONTAINING COMBUSTIBLE COMPOSITIONS

[75] Inventors: Michael E. Hayes, Fernandina Beach; Kevin R. Hrebenar; Jennifer L. Minor, both of Jacksonville, all of Fla.; Lawrence M. Woodworth, Huntington, N.Y.

[73] Assignee: Petroleum Fermentations N.V., Willemstad, Netherlands

[21] Appl. No.: 41,557

[22] Filed: Apr. 23, 1987

Related U.S. Application Data

[60] Continuation-in-part of Ser. No. 780,783, Sep. 27, 1985, and a continuation-in-part of Ser. No. 787,293, Oct. 15, 1985, which is a division of Ser. No. 653,808, Sep. 24, 1984, which is a continuation-in-part of Ser. No. 547,892, Nov. 2, 1983, Pat. No. 4,618,348.

[51] Int. Cl.⁴ .............................................. C10L 1/32
[52] U.S. Cl. .................................. 44/51; 44/62; 44/70; 44/77; 44/604; 44/622; 110/342; 431/2
[58] Field of Search .............. 44/51, 604, 602, 77, 44/70, 62; 110/347, 342; 431/2

[56] References Cited

U.S. PATENT DOCUMENTS

| | | | |
|---|---|---|---|
| 3,514,273 | 5/1970 | Lee et al. | 44/51 |
| 3,640,016 | 2/1972 | Lee et al. | 44/15 R |
| 3,876,391 | 4/1975 | McCoy et al. | 44/51 |
| 3,902,869 | 9/1975 | Fribey et al. | 44/51 |
| 3,941,552 | 3/1976 | Cottell | 431/2 |
| 3,948,617 | 4/1976 | Withorn | 44/51 |
| 4,002,435 | 1/1977 | Wenzel et al. | 44/51 |
| 4,046,519 | 9/1977 | Piotrowski | 44/51 |
| 4,158,551 | 6/1979 | Feuerman | 44/51 |
| 4,162,143 | 7/1979 | Yount, III | 44/51 |
| 4,224,038 | 9/1980 | Massologites et al. | 44/15 R |
| 4,226,601 | 10/1980 | Smith | 44/10 D |
| 4,230,460 | 10/1980 | Maust, Jr. | 44/15 R |
| 4,262,610 | 4/1981 | Hein et al. | 110/342 |
| 4,270,926 | 6/1981 | Burk, Jr. et al. | 44/15 R |
| 4,285,283 | 8/1981 | Lyon et al. | 110/347 |
| 4,445,908 | 5/1984 | Compere et al. | 44/51 |
| 4,456,688 | 6/1984 | Dugan et al. | 44/15 R |
| 4,477,258 | 10/1984 | Lepain | 44/51 |
| 4,517,165 | 5/1985 | Moriarty | 423/244 |
| 4,616,574 | 10/1986 | Abrams et al. | 44/15 R |

FOREIGN PATENT DOCUMENTS

| | | |
|---|---|---|
| 50-26766 | 3/1975 | Japan . |
| 50-46562 | 5/1975 | Japan . |
| 0159291 | 8/1981 | Japan . |
| 1525377 | 8/1978 | United Kingdom . |

OTHER PUBLICATIONS

Dooher, J. et al., "Combustion Studies of Water, Oil Emulsion on a Commercial Boiler Using No. 2 Oil and Low and High Sulfur No. 6 Oil", Fuel, Dec. 1980, 59, pp. 883–892.

"Oil Burning Can be Less 'Fuelish'", Environ. Sci. and Tech., Oct. 1977, 11(10), p. 954.

(List continued on next page.)

Primary Examiner—William R. Dixon, Jr.
Assistant Examiner—Margaret B. Medley
Attorney, Agent, or Firm—Pennie & Edmonds

[57] ABSTRACT

This invention relates to the reduction of oxidized sulfur compound (SOX) emissions produced during combustion of sulfur (S)-containing combustible compounds. More particularly, this invention provides a method for reducing such emissions wherein the combustible compound is mixed with an admixture of a water soluble and a water insoluble sulfur sorbent. Use of such admixtures, remarkably, produces a reduction in the SOX level far greater than would be expected based on the activity of each sorbent alone. Extremely viscous hydrocarbons can be burned as preatomized fuels, which can also be mixed with sorbent admixtures. Clean burning fuels comprising sulfur-containing combustible compounds and sorbent admixtures are also provided.

50 Claims, 3 Drawing Sheets

OTHER PUBLICATIONS

Hall, R. E., "The Effect of Water/Residual Oil Emulsions on Air Pollutant Emissions and Efficiency of Commercial Boilers", J. of Eng. for Power, Oct. 1976, pp. 425–434.

"New Process Replaces Oil as Fuel", Coal Age, Jan. 1976, p. 57.

"Reduction of Flue Gas Emissions by Burning Fuel Oil-Water Emulsions", VEB Kraftwerts-technick, Feb. 1975, 55, pp. 88–93 (Feb. 1975).

Sano, H., "Removal of Sulfur Oxides by Neutralizer Premixing into Fuel (I)—Removal of Sulfur Oxides from Flue Gas by Emulsified Lime Injection Process—", Bulletin of the Environment Industrial Research Institute, Osaka Kogyo Gijutsu Shinenjo Kiho, Sep. 1974, 25(3), pp. 169–173.

Sano, H., "Removal of Sulfur Oxides by Neutralizer Premixing into Fuel (II), Removal of Sulfur Oxides from Glue Gas by the Emulsion Injection of Calcium Salts of Various Fatty Acids," Bulletin of the Government Industrial Research Institute, Osaka Kogyo Gijutsu Shinenjo Koho, Sep. 1974, 25(3), pp. 174–178.

"Chemical Reduces Fly Ash from Boiler", High Technology, May 1986, p. 10.

Radford, H. D. and Rigg, R. G., "New Way to Desulfurize Resids", Hydrocarbon Processing, Nov. 1970, pp. 187–191.

Tregilgas, E. T. and Crowley, D. M., "Need More Jet Fuel? Hydrotreat", Hydrocarbon Processing, May 1969, pp. 120–123.

METHOD FOR REDUCING SOX EMISSIONS DURING THE COMBUSTION OF SULFUR-CONTAINING COMBUSTIBLE COMPOSITIONS

CROSS REFERENCE TO RELATED APPLICATIONS

The present application is a continuation-in-part of Applicants' prior copending application Ser. Nos. 780,783, filed Sept. 27, 1985, and 787,293, filed Oct. 15, 1985, which in turn, are a division and a continuation-in-part, respectively, of copending application Ser. No. 653,808, filed Sept. 24, 1984, which, in turn, is a continuation-in-part of application Ser. No. 547,892, filed Nov. 2, 1983, (which issued as U.S. Pat. No. 4,618,348 on Oct. 21, 1986) all of which are incorporated herein by reference.

1. INTRODUCTION

This invention relates to methods for burning high sulfur (S) content combustible compositions, wherein low, environmentally-acceptable, oxidized sulfur compound (SOX) emissions are realized. More particularly, this invention relates to the mixing of high sulfur content compounds with admixtures of soluble and insoluble sulfur sorbents. Use of such admixtures, it has been found, results in a far greater reduction on SOX emissions, than would be expected from the activity of each sorbent used alone, while exhibiting no deleterious effects on the combustion efficiency.

These admixtures can be used to control the SOX emissions from all high S content combustible materials including hydrocarbon oils and coal/water slurries. Extremely viscous hydrocarbons can be burned as preatomized fuels, i.e., oil-in-water emulsions, the viscosity of which is greatly reduced in comparison with that of the starting hydrocarbon. Thus, a wide array of hydrocarbons previously unsuitable for use due to air pollution constraints can be burned.

2. BACKGROUND OF INVENTION

2.1. Viscous Hydrocarbons

While large quantities of high-quality, relatively inexpensive, light crude oils presently are recoverable from world-wide geographical locations, ever-increasing consumption of petroleum fuels and other petroleum products and the energy crisis precipitated by such high demands have brought interest to bear on the enormous reserves of low-gravity, viscous hydrocarbons which also exist throughout the world. Viscous hydrocarbons present in natural deposits have been generlly classified as viscous crude oils, bitumen or tar and have been variously called heavy crudes, native bitumen, natural bitumen, oil sands, tar sands, bituminous sands or deposits and natural asphalts, all of which materials are chemically gradational and nearly indistinguishable without standardized analyses. [For a discussion of the general characteristics of viscous hydrocarbons and the problem of precisely defining or classifying them, see Meyer, "Introduction" in: The Future of Heavy Crude and Tar Sands, p. 1, Mining Informational Services, McGraw Hill, Inc., New York (1981). See also Section 6.2 infra.]

The geographical distribution of heavy crude reserves is given in Table I [abstracted from Meyer and Dietzman (1981), "World Geography of Heavy Crude Oils," in: The Future of Heavy Crude and Tar Sands, pp. 16–28, Mining Informational Services, McGraw Hill, Inc., New York (1981)]. The total estimated figure for oil in place is $6200 \times 10^9$ barrels. Venezuela heads the list with roughly half of this total, $3000 \times 10^9$ barrels. Canada follows closely with $2950 \times 10^9$ barrels (this total includes hydrocarbon in bitumen), while the United States has an estimated $77 \times 10^9$ barrels. To put these figures in perspective, the total world reserves of oil lighter than 20° API is estimated to be about $660 \times 10^9$ barrels. Yet undiscovered reserves are estimated at $900 \times 10^9$ barrels. Thus, heavy crude is more plentiful than conventional oil by about a factor of four.

TABLE I
WORLD HEAVY OIL DEPOSITS
(Billions of Barrels)

| Country | Resource In-Place | Estimated Recoverable |
|---|---|---|
| Venezuela | 3000 | 500 |
| Canada | 2950 | 213 |
| United States | 77 | 30 |
| Italy | 12 | 1 |
| Madagascar | 25 | 1 |
| Iran | 29 | 3 |
| Iraq | 10 | 1 |

It is clear that reserves of conventional light crudes are being depleted much faster than heavy crudes and that development of world reserves of viscous hydrocarbons will eventually become necessary to support world petroleum demands. Significant production of heavy crudes has begun, primarily by steam-assisted enhanced recovery methods. For example, recent estimates place production of heavy crude oil in California at 250,000 barrels per day. Future estimates [Barnea, "The Future of Heavy Crude and Tar Sands," in: The Future of Heavy Crude and Tar Sands, pp. 13–15, Mining Informational Services, McGraw Hill, Inc., New York (1981)] project that by the year 2000, production of heavy oil plus the bitumen from tar sands will increase to one-third of the world's total oil production. Such rapid development of heavy oil resources will extend the petroleum era and should: (1) allow products from heavy crudes to benefit from the existing energy infrastructure; (2) assure fuel supplies to the transportation sector and feed-stock to petrochemical plants; (3) be a stabilizing factor for world petroleum prices, increasing the number of oil producing countries; (4) reduce the strategic and political aspects of oil production; and (5) postpone the need for massive investments in coal conversion and other facilities for synthetic oil production.

2.2. Combustion of Oil-in-Water Emulsions

The vast majority of combustible emulsions known in the art are water-in-oil emulsions, primarily consisting of relatively small amounts of water (1–10% by volume) in oil to enhance combustion. Some combustible oil-in-water emulsions have been described [see e.g., U.S. Pat. Nos. 3,958,915; 4,273,611 and 4,382,802]. Notably, however, the oil phases used have been light, low viscosity fuels and other low viscosity oils, e.g., kerosene, gasoline, gas oil, fuel oils and other oils which are liquid at room temperature. Combustible thixotropic jet fuels and other safety fuels have been described in U.S. Pat. Nos. 3,352,109; 3,490,237 and 4,084,940. Under resting (stationary) conditions, these oil-in-water emulsions are in the form of gels with apparent rest viscosities of 1000 cps and preferably 50,000–100,000 cps. These thixotropic oil-in-water emulsions exhibit low viscosities under high pumping (high shear) rates.

2.3. Microbial Surface-Active Compounds

Many microbes can utilize hydrocarbon as their sole source or carbon for growth and energy production. The hydrocarbon substrates may be linear, branched, cyclic or aromatic. In order to rapidly assimilate such water-insoluble substrates, the microbes require a large contact area between themselves and the oil. This is achieved by emulsifying the oil in the surrounding aqueous medium. Hydrocarbon degrading microbes frequently synthesize and excrete surface active agents which promote such emulsification.

For example, the growth of *Mycobacterium rhodochrous* NCIB 9905 on n-decane yields a surface active agent which was reported by R. S. Holdom et al. [J. Appl. Bacteriol. 32, 448 (1969)] to be a nonionic detergent. J. Iguichi et al. [Agric. Biol. Chem., 33 1657 (1969)] found that *Candida petrophilium* produced a surface active agent composed of peptides and fatty acid moieties, while T. Suzuki et al. [Agric. Biol. Chem., 33, 1919 (1969)] found trehalose lipid in the oil phase of culture broths of various strains of Arthrobacter, Brevibacterium, Corynebacterium and Nocardia. Wagner has reported the production of trehalose lipids by *Nocardia rhodochrous* and *Mycobacterium phlei* and their use in oil recovery [U.S. Pat. Nos. 4,392,892 and 4,286,660].

*Torulopsis gropengiesseri* was found to produce a sophorose lipid, while rhamnolipids are reported by K. Hisatsuka et al. [Agric. Biol. Chem., 35, 686 (1971)] to have been produced by *Pseudomonas aeruginosa* strain S7B1 and by S. Itoh et al. [Agric. Biol. Chem., 36, 2233 (1971)] to have been produced by another P. aeruginosa strain, KY4025. The growth of *Corynebacterium hydrocarboclastus* on kerosene was reported by J. E. Zajic and his associates [Dev. Ind. Microbiol., 12, 87 (1971); Biotechnol. Bioeng., 14, 331 (1972); Chemosphere 1, 51 (1972); Crit. Rev. Microbiol., 5, 39; U.S. Pat. No. 3,997,398] to produce an extracellular heteropolysaccharide which, among other properties, emulsified kerosene, Bunker C fuel oil and other fuel oils.

Gutnick et al. discovered that *Acinetobacter calcoaceticus* ATCC 31012 (previously designated Acinetobacter sp. ATCC 31012 and also called RAG-1) produces interfacially active extracellular protein-associated lipopolysaccharide biopolymers called emulsans. These biopolymers are produced and build up as a capsule or outer layer around the bacterial cell during growth and are eventually released or sloughed off into the medium, from which they can be harvested as extracellular products. *Acinetobacter calcoaceticus* ATCC 31012 produces α-emulsans when grown on ethanol or fatty acid salts [U.S. Pat. Nos. 4,230,801; 4,234,689 and 4,395,354] and β-emulsans when grown on crude oil or hexadecane [U.S. Pat. No. 3,941,692]. The α-emulsans and β-emulsans can be derivatized to an O-deacylated form called psi-emulsans [U.S. Pat. No. 4,380,504]. The α-emulsans, β-emulsans and psi-emulsans can be deproteinized to yield apo-α-emulsans, apo-β-emulsans and apo-psi-emulsans, respectively [U.S. Pat. Nos. 4,311,830; 4,311,829 and 4,311,831, respectively].

Cooper and Zajic [Adv. Appl. Microbiol. 26:229–253 (1980)] have reviewed the production of surface active compounds by microorganisms. Some of the surface active agents described are listed in Table II.

TABLE II

| MICROBIAL SURFACE ACTIVE COMPOUNDS | |
|---|---|
| STRUCTURAL TYPE | PRODUCING MICROORGANISM(S) |
| Carbohydrates-Lipids | |
| Trehalose-Lipids | Nocardia, Mycobacterium, Corynebacterium, Arthrobacter |
| Rhamnose-Lipids | Pseudomonas aeruginosa |
| Sophorose-Lipids | Torulopsis spp. |
| Polysaccharide-Lipid | Candida tropicalis, Acinetobacter calcoaceticus |
| Amino Acid-Lipids | |
| Lipopeptides | Bacillus, Streptomyces, Corynebacterium, Mycobacterium |
| Ornithine-Lipids | Pseudomonas, Thiobacillus, Agrobacterium, Gluconobacter |
| Phospholipids | Thiobacillus, Corynebacterium, Candida, Micrococcus |
| Fatty Acids/Neutral Lipids | Pseudomonas, Mycococcus, Penicillium, Aspergillus, Acinetobacter, Micrococcus, Candida |

2.4. Reduction of SOX in Combustion Gases

Within the past few years there has been an increasing concern with the immediate and long-term effects of atmospheric pollution produced during the burning of hydrocarbon fuels. During this time, substantial amounts of money and effort have been spent to combat this problem. Additionally, the governmental agencies, on the federal, state, and local levels have issued environmental regulations which severely limit the amount of pollutants which can be released into the atmosphere, consequently forcing users of these fuels to make the choice of burning the more expensive, "clean-burning", fuels or, as the supply of such fuels is shrinking, to seek methods to reduce the emissions released by the combustion of the higher-polluting fuels.

A class of pollutants that has, recently, become a major concern is that of gaseous sulfur compounds such as $H_2S$, COS, $SO_2$, $SO_3$ and the like. When released into the atmosphere, these compounds, it has been postulated, can react with atmospheric moisture and oxygen to form sulfuric acid, which results in "acid rain", severely corrosive precipitation that is detrimental to plant and animal life. For this reason, particularly stringent restrictions have been placed upon the amount of gaseous sulfur compounds, notably the oxidized forms of sulfur produced during sulfur burning, SOX, which can be released into the atmosphere during combustion of fuels. Such restrictions have made it nearly impossible to utilize high sulfur content fuels in standard applications. Since many of the viscous hydrocarbon fuels discussed supra, and much of the world's coal reserves, have high sulfur content, use of a significant portion of the world's petroleum and coal reserves presents difficult environmental and economic problems. As the world's hydrocarbon reserves are shrinking, the use of these other fuels becomes necessary.

For this reason, scientists have attempted to lower the gaseous sulfur emissions of high sulfur content fuels. Three main approaches have been used. In the first, the combustion gases are channelled through an SOX absorbent prior to release into the atmosphere, resulting in reduced SOX levels in the effluent gas. This method, also known as "scrubbing" is the most common method in use today; however, it suffers from the major drawback of requiring significant capital outlay for the design and construction of the system. Nonetheless, this is the principal SOX control method in use today.

An alternative approach involves the removal of the sulfur from the fuel prior to the combustion. This may be accomplished by extracting the sulfur components into solvents having a stronger affinity for the sulfur compounds than the fuel. Such solvents are, however, expensive and often will extract significant amounts of combustible fuel components along with the sulfur. For these reasons, this method has proven to be impractical.

More useful, in the case of petroleum hydrocarbons, is hydrogen addition to convert the sulfur in the sulfur compounds to hydrogen sulfide ($H_2S$), which can be separated from the petroleum fraction. However, this process also requires significant capital outlay.

In the third approach, the fuel is mixed with sulfur sorbents which act to remove the sulfur and the oxidized sulfur compounds during the combustion process. A particular advantage of this approach is that solid compounds can be utilized as sorbents. Such compounds will remain in the solid phase during combustion, thus facilitating the ultimate collection of the sulfur-sulfur sorbent conjugates. Also, because the reaction occurs in the combustion zone, the temperatures are quite high rendering the sorbent species quite reactive; thus, the kinetics of the absorption are directed in favor of the SOX binding.

A major drawback of this method, however, is the lack of adequate sulfur sorbents, thus making efficient sulfur removal difficult. For example, Cottell (U.S. Pat. No. 3,941,552) found in experiments using coal/water slurries that when lime (CaO) is present in a 50% excess of the stoichiometric requirement (to achieve 100% S removal), a 50% reduction in SOX levels is observed; this increases to 80% when twice the stoichiometric requirement of lime is used. Dooher et al. (Fuel, 59, Dec., 1980, pp. 883–891) conducted burn experiments on water-in-oil emulsions of high sulfur oil utilizing soda ash ($Na_2CO_3$) as a sorbent and claimed to have found somewhat better results (50% of the stoichiometric requirement of $Na_2CO_3$ achieved a 45% $SO_2$ removal). However, in a commercial boiler, the use of high concentrations of sodium salts is undesirable due to the well-known side effect of fouling, which necessitates frequent cleaning of the boiler.

There exists, therefore, a real need for efficient sulfur sorbent agents which can effectively limit SOX emissions, yet which will not exhibit deleterious effects such as fouling.

3. SUMMARY OF INVENTION

It is an objective of this invention to provide a method whereby a reduction in the oxidized sulfur (SOX) emissions during the burning of high sulfur content hydrocarbons and coals can be achieved. More particularly, it is an objective of this invention to provide a method whereby sulfur-containing materials, including hydrocarbons, coals, coal/water slurries and hydrocarbon-in-water emulsions, can be burned safely and efficiently, in an environmentally-acceptable manner wherein the SOX emissions are reduced to a value below the permissible local regulatory standard.

It is also an objective of this invention to provide clean burning combustible compositions which, during combustion, will produce lower sulfur emissions than the neat hydrocarbons or coals.

This invention provides a method for decreasing SOX emissions during combustion of high sulfur content hydrocarbons and coals by adding to such materials an admixture of insoluble and soluble sulfur sorbents prior to the burning. It has been found that, remarkably, this admixture of sulfur sorbents provides a higher degree of SOX emission reduction than would be predicted on the basis of the reduction efficiency of each sorbent individually, i.e., the admixture components exhibit a catalytic effect on the SOX removal efficiency of each other. By use of these sorbents, the SOX emissions during combustion of high sulfur content hydrocarbons (including coals) can be brought within environmentally acceptable levels, making such materials commercially useful.

This invention also provides methods for reducing the SOX emissions during the combustion of viscous, high sulfur content hydrocarbons by forming preatomized fuels (hydrocarbon-in-water emulsions) and adding the insoluble/soluble sorbent admixture to the preatomized fuels. As with the unemulsified fuel compositions described above, the admixture achieves a remarkable reduction in SOX emissions when the preatomized fuel is burned. Similar reductions can be seen using coal/water slurries treated with the sorbents as fuels.

This invention also provides fuel compositions comprised of sulfur-containing combustible compounds, including preatomized fuels and coal slurries, and admixtures of soluble/insoluble sulfur sorbents, which exhibit reduced SOX emissions when burned.

4. NOMENCLATURE

The term "hydrocarbosol" is defined as any bioemulsifier-stabilized hydrocarbon-in-water emulsion wherein the individual hydrocarbon droplets are essentially surrounded or covered by water-soluble bioemulsifier molecules predominantly residing at the hydrocarbon/water interface, which bioemulsifier molecules form an effective barrier against droplet coalescence and hence promote the maintenance of discrete hydrocarbon droplets suspended or dispersed in the continuous, low-viscosity aqueous phase.

The term "water-soluble" is defined to include water-dispersible substances.

The term "viscous hydrocarbon" is defined as any naturally occurring crude oil or any residual oil remaining after refining operations which is generally characterized by a viscosity of about $10^2$–$10^6$ centipoise or greater and otherwise generally, but not necessarily, characterized by an API gravity of about 20° API or less, high metal content, high sulfur content, high asphaltene content and/or high pour point. The term "viscous hydrocarbon," it is to be understood, also encompasses the following nomenclature: vacuum residuals, vis-breaker residuals, catalytic-cracker residuals, catalytic hydrogenated residuals, coker residuals, ROSE (residual oil supercritical extraction) residuals, tars and cut-back tars, bitumen, pitch and any other terms describing residuals of hydrocarbon processing.

The term "pre-atomized fuel" is defined as any hydrocarbosol and any viscous hydrocarbon-in-water emulsion formed by methods described herein for use as a combustible fuel.

The term "bioemulsifier" is defined as any biologically derived substance which, by virtue of any combination of characteristics including, but not limited to, high molecular weight, polymeric nature, highly specific three-dimensional structure, hydrophobic and hydrophilic moieties and sparing solubility in hydrocarbons, binds tightly to the hydrocarbon/water interface and essentially covers the surface of individual hydrocarbon droplets in hydrocarbon-in-water emulsions, effectively maintaining discrete droplets and preventing coalescence, and thereby imparting substantial stability to hydrocarbon-in-water emulsions. An example of a bioemulsifier is α-emulsan.

The term "biosurfactant" is defined as any biologically derived substance which reduces the interfacial tension between water and a hydrocarbon and, as a result, reduces the energy requirement (mixing energy) for creation of additional interfacial area. An example of a biosurfactant is a glycolipid.

The term "surfactant package" is defined as any composition useful for forming hydrocarbon-in-water emulsions of viscous hydrocarbons generally characterized by a paraffin content of about 50% by weight or less and an aromatic content of about 15% by weight or greater with viscosities of about 100 centipoise or greater at 150° F., which composition may comprise a chemical surfactant or a combination of chemical co-surfactants or a combination of co-surfactant(s) and biosurfactant(s) or a combination of chemical surfactant(s) and bioemulsifier(s) or a combination of chemical surfactant(s), biosurfactant(s) and bioemulsifier(s), and which may also include chemical emulsion stabilizers, and which may be in aqueous form.

The term "emulsans," which reflects the polysaccharide structure of these compounds and the exceptional bioemulsifier activity of these materials, generically identifies those capsular/extracellular microbial protein-associated lipoheteropolysaccharides produced by *Acinetobacter calcoaceticus* ATCC 31012 and its derivatives or mutants, which may be subdivided into the α-emulsans and the β-emulsans. The name "apoemulsan" generically identifies those deproteinized lipopolysaccharides obtained from the emulsans.

The term "α-emulsans" defines those extracellular microbial protein-associated lipopolysaccharides produced by *Acinetobacter calcoaceticus* ATCC 31012 and its derivatives or mutants in which the lipopolysaccharide components (i.e., without the associated protein) are completely N-acylated and partially O-acylated heteropolysaccharides made up of major amounts of D-galactosamine and an aminouronic acid, the lipopolysaccharide components containing at least 5 percent by weight of fatty acid esters in which (1) the fatty acids contain from about 10 to about 18 carbon atoms; and (2) about 50 percent by weight or more of such fatty acids are composed of 2-hydroxydodecanoic acid and 3-hydroxydodecanoic acid. It follows, therefore, that the deproteinized α-emulsan are called "apo-α-emulsans."

The term "β-emulsans" defines those extracellular microbial protein-associated lipopolysaccharides produced by *Acinetobacter calcoaceticus* ATCC 31012 and its mutants in which the lipopolysaccharide components (i.e., without the associated protein) are completely N-acylated and partially O-acylated heteropolysaccharides made up of major amounts of D-galactosamine and an aminouronic acid, the lipopolysaccharide components containing less than 5 percent by weight of fatty acid esters in which (1) the fatty acids contain from about 10 to about 18 carbon atoms; and (2) less than 50 percent by weight of such fatty acids are composed of 2-hydroxydodecanoic acid. The deproteinized β-emulsans are called "apo-β-emulsans."

The term "psi-emulsans" defines the O-deacylated extracellular protein-associated microbial polysaccharides obtained from the emulsans, the protein-free components of such psi-emulsans being completely N-acylated heteropolysaccharides made up of major amounts of D-galactosamine and an aminouronic acid and containing from 0 to 1 percent of fatty acid esters in which, when present, the fatty acids contain from about 10 to about 18 carbon atoms. These protein-free components are called "apo-psi-emulsans," regardless of how they are prepared.

The term "polyanionic heteropolysaccharide biopolymers" defines those biopolymers in which (a) substantially all of the sugar moieties are N-acylated aminosugars, a portion of which is N-acylated-D-galactosamine and another portion of which is N-acylated aminouronic acid, a part of the N-acyl groups of such heteropolysacchardide being N-3-hydroxydodecanoyl groups; and (b) at least 0.2 micromoles per milligram of such heteropolysaccharide consist of fatty acid esters in which (1) the fatty acids contain about 10 to about 18 carbon atoms and (2) about 50 percent by weight or higher of such fatty acids are composed of 2-hydroxydodecanoic acid and 3-hydroxydodecanoic acid.

The term "SOX" defines all oxidized sulfur compounds produced during sulfur combustion without reference to the degree of oxidation.

The term "hydrocarbon" is defined as any naturally occurring petroleum crude oil, residue, or distillate, including coals.

The term "sulfur containing combustible compound" refers to all combustible compounds which contain measurable quantities of sulfur compounds and which, when burned, produce measurable amounts of SOX.

The term "high sulfur content" includes all compounds which, when burned, have a SOX emission level which exceeds the standard set by the local regulatory authority.

The term "slurry" includes all dispersoids wherein a ground or pulverized solid phase is dispersed in a continuous liquid phase.

5. BRIEF DESCRIPTION OF THE FIGURES

6. DETAILED DESCRIPTION OF THE INVENTION

6.1. Surfactant Packages

Figure 1:
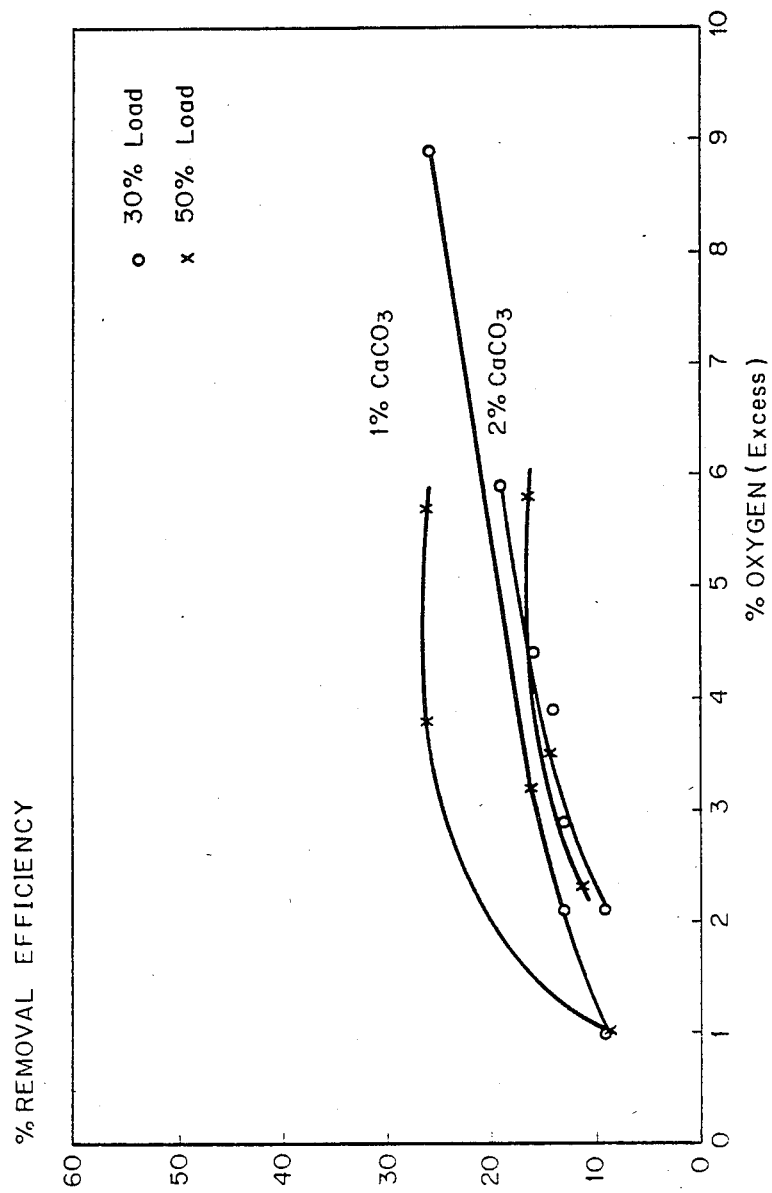
FIG. 1 is a graphical representation of the Removal Efficiency as a function of % excess oxygen with the addition of 1% and 2% $CaCO_3$ as a S sorbent, at 30 and 50% furnace loads.

The surfactant packages suitable for forming preatomized fuels can be formulated with a wide variety of chemical and microbial surface active agents and are preferably formulated with water-soluble surface active agents to provide for the formation of oil-in-water, as opposed to water-in-oil, emulsions. The surfactant packages can be formulated with numerous chemical surfactants, used alone or in conjunction with chemical co-surfactants of the same type (e.g., a combination of water-soluble nonionic surfactants) or of different types (e.g., a combination of water-soluble nonionic, anionic, cationic and/or amphoteric surfactants), and can be further formulated in combination with (a) a water-soluble biosurfactant or combination of biosurfactants as co-surfactant(s) and/or (b) a water-soluble bioemulsifier or combination of bioemulsifiers as emulsion stabilizer(s). In certain instances, chemical emulsion stabilizers may also be used in place of bioemulsifiers. It is also possible to formulate surfactant packages comprising only microbial surface active agents, i.e., combinations of biosurfactants and bioemulsifiers. The surfactant packages vary with the type of viscous oil to be emulsified. The following general compositions are offered by way of illustration. For viscous crudes, surfactant packages can be formulated to comprise at least one chemical surfactant and at least one bioemulsifier. They can also be formulated to comprise at least one water-soluble nonionic surfactant, at least one water-soluble anionic surfactant, and at least one bioemulsifier. For viscous crudes or viscous residuals, surfactant packages can be formulated to comprise at least one water-soluble non-ionic surfactant or at least one anionic surfactant or combinations of non-ionic surfactants and anionic surfactants and which can further comprise biosurfactants and/or bioemulsifiers.

The types of water-soluble nonionic chemical surfactants suitable for use in the surfactant packages are listed in Table III.

TABLE III
CLASSES AND SUBCLASSES OF NONIONIC CHEMICAL SURFACTANTS

Alcohols, ethoxylated
Alkylphenols, ethoxylated
Carboxylic Esters, ethoxylated
Glycerol Esters
Polyethylene Glycol Esters
Anhydrosorbitol Esters
Ethoxylated Anhydrosorbitol and Sorbitol Esters
Natural Fats and Oils, ethoxylated
Ethylene and Diethylene Glycol Esters
Propanediol Esters
Other Carboxylic Acid Esters
Carboxylic Amides, Ethoxylated
Amines, polyoxyalkylated
Polyalkylene Oxide Block Copolymers
Poly(oxyethylene-co-oxypropylene) Block Copolymers
Reverse Block Copolymers
Polyalkylene Oxide Copolymers In surfactant packages for viscous crudes, the preferred water-soluble nonionic chemical surfactants are ethoxylated alkyl phenols and ethoxylated alcohols. In surfactant packages for viscous residuals, the preferred water-soluble nonionic surfactants are, again, ethoxylated alkyl phenols and also polyoxyalkylated amines. The ethoxylated alkyl phenols are of the general formula:

$$R_xC_6H_4(OC_2H_4)_nOH$$

wherein R represents an alkyl group containing from about 8 to about 12 carbon atoms (i.e., about $C_8$ to about $C_{12}$), x represents the number of alkyl groups and is either 1 or 2, and wherein n represents the number of ethoxy groups (moles ethylene oxide) which can range from about 1 to about 100. [For a list of commercially available ethoxylated alkylphenols, see "Surfactants and Detersive Systems" in: Encyclopedia of Chemical Technology, Kirk-Othmer (Third Edition), Volume 22, pp. 366-367, John Wiley & Sons, New York (1983).] In surfactant packages for viscous crudes, preferred ethoxylated alkyl phenols are those having R groups of 8 or 9 carbon atoms and having from about 7 to about 100 ethoxy groups. An example of a particularly preferred ethoxylated alkyl phenol is mononoylphenol with about 40 ethoxy groups.

The ethoxylated alcohols are of the general formula:

$$R(OC_2H_4)_nOH$$

wherein R represents an aliphatic group (linear or branched) containing from about 6 to about 18 carbon atoms and wherein n represents the number of ethoxy groups which can range from about 2 to about 100. [For a list of commercially available ethoxylated alcohols, see "Surfactants and Detersive Systems" in: Encyclopedia of Chemical Technology, supra, pp. 364-365.] Examples of ethoxylated alcohols include ethoxylated trimethylnonanols with about 3 to about 9 ethoxy groups and ethoxylated secondary alcohols having R groups of about 11 to about 15 carbon atoms with about 3 to about 30 ethoxy groups, but preferably greater than about 7 ethoxy groups.

The polyoxyalkylated amines are of the general formula:

$$R_xN_y(CH_2)_2$$

wherein R represents an oxyalkyl group containing either 2 or 3 carbon atoms. These R groups can range in number from about 4 to about 500, and that number is represented by x. The number of amine groups is represented by y and the alkyl group is preferably ethyl ($C_2H_4$). Preferred polyoxyalkylated amines are those having R groups of 2 or 3 carbon atoms and having from about 50 to about 450 oxyalkyl groups. An example of a particularly preferred polyoxyalkylated amine is a polyoxyalkylated diamine with about 50 ethoxy groups and about 60 propoxy groups.

The types of water-soluble anionic chemical surfactants suitable for use in the surfactant packages are listed in Table IV.

TABLE IV
CLASSES AND SUBCLASSES OF ANIONIC CHEMICAL SURFACTANTS

Carboxylic Acids and Salts
Sulfonic Acids and Salts
  Lignosulfonates
  Alkylbenzenesulfonates
  Alkylbenzenesulfonates, polymerized
  Alkylarylsulfonates, short chain
  Alkylarylsulfonates, polymerized
  Naphthalenesulfonates
  Alkylnaphthalenesulfonates, polymerized
  Naphthalene/formaldehyde condensate polymers
  Petroleum Sulfonates
  Sulfonates with ester, ether, or amide linkages
  (dialkyl sulfosuccinates)
  Other Sulfonates
Sulfuric Acid Esters and Salts
  Alcohols, sulfated
  Alcohols, ethoxylated and sulfated
  Alkylphenols, ethoxylated and/or sulfated
  Acids, Amides, and Esters, sulfated
  Natural Fats and Oils, sulfated
Phosphoric and Polyphosphoric Acid Esters (and Salts)
  Alcohols and Phenols, alkoxylated and
  phosphated (and their salts)
  Other Phosphoric and Polyphosphoric Acid
  Esters (and their salts)

TABLE IV-continued
CLASSES AND SUBCLASSES OF ANIONIC CHEMICAL SURFACTANTS Carboxylic Acid Esters In surfactant packages for both viscous crudes and viscous residuals, the preferred water-soluble anionic chemical surfactants are sulfonated or sulfated forms of nonionic surfactants. In surfactant packages for viscous crudes, ethoxylated alcohol sulfates are preferred. In surfactant packages for viscous residuals, sulfonated or sulfated ethoxylated alkylphenols and ethoxylated alcohol sulfates are preferred. In surfactant packages for both viscous crudes and viscous residuals, alkylaryl sulfonates are also preferred anionic chemical surfactants. The ethoxylated and sulfated alcohols are of the general formula:

$$R(OC_2H_4)_nOSO_3M$$

wherein R represents an aliphatic group containing from about 6 to about 16 carbon atoms, preferably from about 12 to about 14, n represents the number of ethoxy groups which can range from about 1 to about 4, preferably from about 2 to about 3, and M includes, but is not limited to, ammonium ($NH_4$), sodium (Na), potassium (K), calcium (Ca) or triethanolamine, preferably ammonium. [For a list of commercially available ethoxylated alcohol sulfates, see "Surfactants and Detersive Systems" in: Encyclopedia of Chemical Technology, supra, p. 357.] The alcohol moiety of the ethoxylated alcohol sulfate can be an even or odd number or mixture thereof. In surfactant packages for viscous crudes, an example of a particularly preferred ethoxylated alcohol sulfate is poly(3)ethoxy $C_{12}$-$C_{14}$ linear primary alcohol sulfate, ammonium salt. It is also possible to use nonethoxylated alcohol sulfates, i.e., alcohol sulfates of the formula $R(OC_2H_4)_nOSO_3M$ as described supra but wherein n=0. In surfactant packages for viscous residuals, an example of a particularly preferred nonethoxylated alcohol sulfate is the sodium salt of a sulfated lauryl alcohol.

The sulfated ethoxylated alkylphenols are of the general formula:

$$RC_6H_4(OC_2H_4)_nOSO_3M$$

wherein R represents an aliphatic group containing at least about 8 or 9 carbon atoms, n represents the number of ethoxy groups which can range from about 1 to about 100, preferably from about 4 to about 9 and M includes, but is not limited to, ammonium ($NH_4^+$), sodium ($Na^+$), potassium ($K^+$) and calcium ($Ca^{++}$) or triethanolamine (TEA), preferably ammonium.

An example of a particularly preferred sulfated ethoxylated alkylphenol is the ammonium salt of a sulfated nonylphenol ethoxylate containing, but not limited to, about 4 ethoxy groups.

The alkylaryl sulfonates are of the general formula:

$$R_nAR_m(SO_3)_xM$$

wherein Ar is an aromatic group which is benzyl, naphthyl, phenyl, tolyl, xylyl or ethylphenyl, R is a linear or branched chain alkyl group containing from about 2 to about 16 carbon atoms, n is 1 or 2, m is 1 or greater, x is at least about 1, and M includes, but is not limited to, ammonium, sodium, potassium, calcium or triethanolamine. [For a list of commercially available alkylaryl sulfonates, see "Surfactants and Detersive Systems" in: Encyclopedia of Chemical Technology, supra, p. 358.]

An example of an alkylaryl sulfonate is a modified amine dodecylbenzene sulfonate. In surfactant packages for viscous residuals, an example of a particularly preferred alkylaryl sulfonate is the sodium salt of polymerized alkylnaphthalene sulfonate.

The preferred water-soluble microbial surface active agents for use in the surfactant packages are any microbial or other biologically-derived substances which function as bioemulsifiers, i.e., substances which, by virtue of such characteristics as large molecular weight, polymeric nature, highly specific three-dimensional structure, hydrophobic and hydrophilic nature, and sparing solubility in oil, effectively cover the oil/water interface maintaining discrete, individual oil droplets in oil-in-water emulsions thereby substantially stabilizing emulsions from coalescence. Among the preferred bioemulsifiers are heteropolysaccharide biopolymers produced by bacteria of the genus Acinetobacter and the genus Arthrobacter, and in particular, those produced by strains of *Acinetobacter calcoaceticus*. Such Acinetobacter heteropolysaccharide biopolymers include, but are not limited to, polyanionic heteropolysaccharide biopolymers, α-emulsans, β-emulsans, psi-emulsans, apo-α-emulsans, apo-β-emulsans and apo-psi-emulsans produced by *Acinetobacter calcoaceticus* ATCC 31012 (deposited at the American Type Culture Collection in Rockville, MD) defined in Section 4 and described in U.S. Pat. Nos. 4,395,353; 4,395,354; 3,941,692; 4,380,504; 4,311,830; 4,311,829; and 4,311,831, respectively (hereby incorporated by reference). Other *Acinetobacter calcoaceticus* materials that can be used are the products of strains NS-1 (NRRL B-15847), NS-4 (NRRL B-15848), NS-5 (NRRL B-15849), NS-6 (NRRL B-15860) and NS-7 (NRRL B-15850). The foregoing "NS" strains have been deposited at the Northern Regional Research Center in Peoria, IL and have been assigned the foregoing NRRL accession numbers. The "NS" strains of *Acinetobacter calcoaceticus* are described by Sar and Rosenberg, Current Microbiol. 9(6):309–314 (1983), hereby incorporated by reference. Other Acinetobacter heteropolysaccharide biopolymers are those produced by *Acinetobacter calcoaceticus* BD4 [Taylor and Juni, J. Bacteriol. 81: 688–693 (1961), hereby incorporated by reference]. Particularly preferred Acinetobacter heteropolysaccharide biopolymers are the β-emulsans, the production of which is further described in U.S. Pat. Nos. 4,230,801 and 4,234,689 (hereby incorporated by reference). The α-emulsans are characterized by a Specific Emulsification Activity of about 200 units per milligram or higher, where one unit per milligram of Specific Emulsification Activity is defined as that amount of emulsifying activity per milligram of bioemulsifier which yields 100 Klett absorption units using a standard hydrocarbon mixture consisting of 0.1 ml of 1:1 (v/v) hexadecane/2-methylnaphthalene and 7.5 ml of TrisMagnesium buffer.

The foregoing Acinetobacter bioemulsifiers can be used in the surfactant packages in a variety of forms including, but not limited to, post-fermentation whole broth; cell-free (Millipore-filtered, e.g.) or partially cell-free supernatants of post-fermentation culture broth; the cells themselves; protease-treated, liquid or dried materials; and protease-treated, ultrafiltered, liquid or dried materials.

Numerous other microbial organisms may possibly serve as a source of biological surface active agents, including biosurfactants and bioemulsifiers, for use in the surfactant packages. Some of these microorganisms and the types of compounds they produce are listed in Table V, though the list is not exhaustive. The surfactant packages may also be formulated with water-soluble cationic chemical surfactants, including, but not limited to, oxygen-free amines, oxygen-containing amines, amide-linked amines and quaternary ammonium salts. Use of cationic chemical surfactants in conjunction with microbial surface active agents would require that the charge characteristic of the biological compounds be considered. For example, cationic chemical surfactants would probably best be used in conjunction with neutral microbial surface active agents and would probably best not be used in conjunction with the preferred polyanionic heteropolysaccharide bioemulsifiers.

TABLE V

| MICROBIAL SURFACE ACTIVE AGENTS | |
|---|---|
| Microbial Compound | Microbial Source |
| Carbohydrate-containing surface active agents | |
| Trehalose lipids | Arthrobacter spp. |
| | Arthrobacter paraffineus KY4303 |
| | Mycobacterium spp. |
| | Mycobacterium smegmatis |
| | Mycobacterium kansasii |
| | Mycobacterium tuberculosis |
| | Mycobacterium phlei |
| | Mycobacterium rhodochrous |
| | Mycobacterium fortuitum |
| | Nocardia spp. |
| | Nocardia asteroides |
| | Nocardia rhodochrous |
| | Corynebacterium spp. |
| | Corynebacterium diphtheriae |
| | Brevibacterium |
| Rhamnolipids | Arthrobacter paraffineus |
| | Pseudomonas aeruginosa |
| Sophorose lipids | Torulopsis spp. |
| | Torulopsis magnoliae |
| | Torulopsis gropengiesseri |
| Diglycosyl diglycerides | Lactobacillus fermenti |
| Polysaccharide-lipid complexes | Arthrobacter spp. |
| | Candida tropicalis |
| Amino acid-containing surface active agents | |
| Lipopeptides | Bacillus subtilis |
| | Bacillus mesentericus |
| | Candida petrophilum |
| | Streptomyces canus |
| | Corynebacterium lepus |
| | Nocardia asteroides |
| | Mycobactrium paratuberculosis |
| | Mycobacterium fortuitum |
| Ornithine lipids | Pseudomonas rubescens |
| | Thiobacillus thioxidans |
| | Agrobacterium tumefaciens |
| | Gluconobacter cerinus |
| Protein | Pseudomonas aeruginosa |
| Phospholipids | Thiobacillus thiooxidans |
| | Corynebacterium lepus |
| | Corynebacterium alkanolyticum |
| | Candida tropicalis |
| | Micrococcus cerificans |
| Fatty acids and Neutral lipids | |
| Carboxylic acids | Corynbacterium lepus |
| | Pseudomonas spp. |
| | Mycococcus spp. |
| | Penicillium spp. |
| | Aspergillus spp. |
| | Acinetobacter spp. |
| | Micrococcus cerificans |

TABLE V-continued

| MICROBIAL SURFACE ACTIVE AGENTS | |
|---|---|
| Microbial Compound | Microbial Source |
| | Candida cloacae |
| Neutral lipids and mixtures of fatty acids | Mycobacterium rhodochrous |
| | Arthrobacter paraffineus |
| | Arthrobacter paraffineus ATCC 19558 |
| | Mycobacterium lacticolum |
| | Acinetobacter spp. |
| | Thiobacillus thiooxidans |
| Polysaccharides | |
| Heteropolysaccharides | Xanthomonas campestris |
| | Xanthomonas campestris NRRL B1459 |
| | Arthrobacter viscosus |
| | Arthrobacter viscosus NRRL B1973 |
| | Methylomonas spp. |
| Homopolysaccharides | Lactobacillus spp. |
| | Methylomonas mucosa NRRL B5696 |
| Lipopolysaccharides | Acinetobacter calcoaceticus |
| | Acinetobacter calcoaceticus ATCC 31012 |
| | Pseudomonas fluorescens |
| | Yersinia pseudotuberculosis |
| | Yersinia pestis |
| | S. calcoaceticus |
| Other Surface Active Agents unknown or poorly characterized | Pseudomonas spp. |
| | Pseudomonas aeruginosa |
| | Pseudomonas oleororans |
| | Pseudomonas putida |
| | Pseudomonas desmolyticam |
| | Pseudomonas methanica |
| | Corynebacterium spp. |
| | Corynebacterium sp. ATCC 21235 |
| | Corynebacterium hydrocarboclastus UW0409 |
| | Bacillus subtilis |
| | Bacillus hexacarbororum |
| | Candida spp. |
| | Candida utilis |
| | Candida utilis ATCC 9226 |
| | Candida guilliermondii |
| | Candida rugosa |
| | Candida lypolytica |
| | Aspergillus niger |
| | Aspergillus versicolor |
| | Desulfovibrio hydrocarbonoclasticus |
| | Desulfovibrio desulfuricans |
| | Endomycopsis lipolytica |
| | Saccharomycopsis lipolytica |
| | Aerobacter aerogenes |
| | Aerobacter aceti |
| | Aerobacter peroxydans |
| | Alcaligines entrophus |
| | Achromobacter spp. |
| | Achromobacter sp. ATCC 21910 |
| | Achromobacter agile |
| | Achromobacter tropunctatum |
| | Actinomyces oligocarbophilus |
| | Aureobasidium pullulans |
| | Arthrobacter sp. ATCC 21908 |
| | Micrococcus spp. |
| | Micrococcus sp. ATCC 21909 |
| | Micrococcus cerificans ATCC 14987 |
| | Micrococcus paraffinae |
| | Microbacterium thodochrous |
| | Mycobacterium phlei |
| | Nocardia opacus |
| | Nocardia corrallina |
| | Pencillium spp. |
| | Pichia spartinae |

Surfactant packages can be formulated from nonionic chemical surfactants or combinations of nonionic and anionic chemical surfactants without bioemulsifiers but preferably, for emulsion stabilization, with bioemulsifiers in the range of about 1% to about 50% by weight. Surfactant packages comprising bioemulsifiers in the range of about 10% to about 20% by weight and particularly around 15% by weight are preferred.

6.2 Viscous Crude Oils and Residual Oils

Surfactant package compositions can be used to emulsify or emulsify and substantially stabilize numerous viscous hydrocarbons in oil-in-water emulsions which may be directly burned. Viscous hydrocarbons encompass naturally-occuring viscous crude oils (also called heavy crude oils) as well as residual bottom-of-the-barrel products from refineries, such as vacuum resid, other residual fuel oils and asphalt. [See Section 4, Nomenclature, supra.] While low gravity does not necessarily coincide with high density, these characteristics are generally correlated in viscous hydrocarbons.

Generally, the following characteristics are considered typical of the types of crude oils and residual oils:
1. Low API gravity, generally at or below about 20° API. This is the most frequently used criterion, both because it is easily measured and because 20° API crude roughly corresponds to the lower limit recoverable with conventional production techniques.
2. Viscosities in the range of about $10^2$ to $10^6$ centipoise (cp) or even higher in some cases.
3. High metal contents. For example, heavy crudes often have nickel and vanadium contents as high as 500 ppm.
4. High sulfur content.
5. High asphaltene content.
6. High pour point.

It is to be noted, of course, that lighter crudes may also be emulsified and/or stabilized with surfactant packages, and such emulsion formation, to yield preatomized fuels, often aids in the handling and combustion of these materials. Since lighter crudes can also contain measurable quantities of sulfur, the use of formation of preatomized fuels from these lighter oils may be useful for the purposes of this invention.

These viscous hydrocarbons which can be emulsified with the surfactant packages and which are most useful to emulsify for transportation and/or burning purposes can be generally defined as having a paraffin content of about 50% by weight or less and an aromatic content of about 15% by weight or greater with viscosities of about 100 centipoise or greater at 150° F. The viscous residuals generally are characterized by a paraffin content in the range from about 4% to about 40% by weight, an aromatic content in the range from about 15% to about 70% by weight and an asphaltene content from about 5% to about 80% by weight.

More specifically, the types of crude oils that can be successfully emulsified and stabilized with surfactant packages include Boscan (Venezuela) crude, an east Texas crude, Jibaro and Bartra (Peru) crudes, El Jobo (Venezuela) crude, and a Kansas crude. The specific viscous residuals that can be successfully emulsified and stabilized with surfactant packages include California vacuum resid, Oklahoma vacuum resid, German visbreaker resid, Texas visbreaker resid, catalytic hydrogenated resid, ROSE bottoms, cutback tar, pyrolysis pitch, and propane deasphalted tar.

Furthermore, residual fuel oils such as those classified as ASTM Grade Number 6 Oils can also be emulsified. Number 6 oils, sometimes referred to as "Bunker C" oils, are high-viscosity oils used mostly in commercial and industrial heating. Their utilization normally requires preheating in the storage tank to permit pumping, and additional preheating at the burner to permit atomizing. The extra equipment and maintenance required to handle Number 6 fuels in nonemulsified form usually precludes its use in small installations. The ASTM standard specifications for Number 6 fuel oils are summarized in Table VI ["Standard Specification for Fuel Oils," ASTM Designation D396-80, in: 1981 Book of ASTM Standards, Part 23].

TABLE VI
DETAILED REQUIREMENTS FOR NUMBER 6 FUEL OILS

| | Grade of Fuel Oil (No. 6, Preheating Required for Burning and Handling) | |
|---|---|---|
| | Minimum | Maximum |
| Flash Point, °C. (°F.) | 60 (140) | |
| Water and Sediment, Vol % | | 2.00[2] |
| Saybolt Viscosity, s[1] Universal at 38° C. (100° F.) | (900) | (9000) |
| Furol at 50° C. (122° F.) | (45) | (300) |
| Kinematic Viscosity, cSt[1] At 50° C. (122° F.) | 92 | 638 |

[1] Viscosity values in parentheses are for information only and not necessarily limiting.
[2] The amount of water by distillation plus the sediment by extraction shall not exceed 2.00%. The amount of sediment by extraction shall not exceed 0.50%. A deduction in quantity shall be made for all water and sediment in excess of 1.0%

6.3. Emulsion Formation

The surfactant packages of Section 6.1 can be used to form oil-in-water emulsions containing as much as about 90% volume of the hydrocarbons described in Section 6.2. The aqueous phase into which the hydrocarbon is emulsified can be deionized water, water from a municipal source, or any water, even water with relatively large amounts of dissolved solids such as connate waters or brines, normally located in proximity to oil production, transportation or utilization sites. The aqueous phase can also be an alcohol/water mixture such as methanol/water, ethanol/water or other lower alkanol/water mixtures, and may further contain additives such as anti-corrosion agents, anti-pollution agents or combustion improvers. Oil-in-water emulsions preferably contain oil/water ratios of about 50/50 to about 80/20, and more preferably from about 60/40 to about 75/25.

In forming oil-in-water emulsions, it is economically desirably to use as little of the surfactant package as possible while maintaining acceptable emulsion characteristics to suit the particular transportation or utilization requirements. The surfactant packages of Section 6.1 can be used in proportions of surfactant package:hydrocarbon from about 1:100 to about 1:2,000 by weight. The proportion used can depend on the type of hydrocarbon to be emulsified and/or the purpose for emulsifying it.

Oil-in-water emulsion formation can be brought about by any number of suitable procedures. For example, the aqueous phase containing an effective amount of surfactant package can be contacted with the hydrocarbon phase by metered injection just prior to a suitable mixing device. Metering is preferably maintained such that the desired hydrocarbon/water ratio remains relatively constant. Mixing devices such as pump assemblies or in-line static mixers can be used to provide sufficient agitation to cause emulsification. As a more specific example, for the transportation or utilization of residual oils, it may be possible to emulsify the hot residual oil in about 30% aqueous phase (v/v) with one of the surfactant packages of Section 6.1 as it exits the vacuum still of a refinery.

6.3.1. Formation of Pre-Atomized Fuels at High Temperatures

Some low gravity residual hydrocarbons are extremely viscous and require very high temperatures to make them fluid enough to handle. Such hydrocarbons can be characterized by a viscosity greater than about 1000 cp at 212° F. Maintaining such high temperatures is not economically feasible for the long term storage and transportation of these hydrocarbons. Also, it is not economically feasible to blend these viscous hydrocarbons with much lighter oils (cutter stock) due to either the quantity of lighter oil required to achieve a viscosity which can be handled or the unfavorable characteristics of the viscous hydrocarbon which do not allow for homogeneous blending of lighter oils.

A novel approach to handling extremely viscous hydrocarbons is the stable dispersion of such viscous hydrocarbons into water to form pre-atomized fuels. Pre-atomized fuel formation is achieved by heating the viscous hydrocarbon to a high temperature in order to make it fluid. The hot hydrocarbon phase is brought in contact with the aqueous phase containing appropriate surfactants and/or stabilizers as described in Section 6.1. A key to achieving successful pre-atomized fuel formation is the maintenance of pressure throughout the entire process such that the aqueous phase is not allowed to vaporize. By maintaining the appropriate pressure, i.e., the pressure required to prevent the water in the aqueous phase from boiling, the aqueous phase remains in a liquid state, thus allowing the stable dispersion of the hydrocarbon phase into a continuous water phase. The resulting hot pre-atomized fuel may be rapidly cooled using an appropriate heat exchange device so that the outlet temperature of the pre-atomized fuel is below the vaporization temperature of the aqueous phase at ambient pressure. Alternatively, the pressure may be reduced and the mixture cooled by flashing a portion of the water contained in the pre-atomized fuel.

6.3.2. Formation of Pre-Atomized Fuels Using a Thermally Cracked Hydrocarbon Discharge As is generally known in the refining industry, residual hydrocarbons obtained from the discharge of thermal cracking units have presented unusual problems. The extreme conditions required in processing to obtain greater quantities of high gravity hydrocarbons have resulted in resids which are very susceptible to separation into distinct, non-mixable fractions. The reasons for the occurrence of this phenomenon are not fully known; however, it is believed that the destabilization of high molecular weight components such as asphaltenes is a contributing factor. When such hydrocarbons are used to form pre-atomized fuels as described in Section 6.3., the resulting oil-in-water emulsion may separate into three phases after a short period of static storage. These phases consist of a low API gravity hydrocarbon bottom phase, a water/surfactant middle phase, and a high API gravity hydrocarbon upper phase. Without wishing to be bound or restricted by any particular theory, applicants theorize that the separation may be due to the slow cooling of the pre-atomized fuel which allows sufficient time for the occurrence of complex interactions that may be attributed to both "sticky state" and Ostwald ripening phenomena. The tendency toward separation can be decreased by the use of an appropriate heat exchange device or method to rapidly quench the freshly formed pre-atomized fuel to a temperature at least about 100° F. below the softening point of the hydrocarbon. By rapidly quenching the oil-in-water emulsion as it exits the mixing unit, a stable pre-atomized fuel is achieved that does not separate with time. It is further theorized that the rapid cooling of the hot pre-atomized fuel does not allow sufficient time for the complex interactions stated above to occur.

6.3.3. Mixing of a Slurry With a Pre-Atomized Fuel

An economical way to increase the btu content of a liquid fuel is achieved by incorporating a high softening point hydrocarbonaceous material (such as coal, coke, ROSE residual, etc.) into a lower softening point fuel. This is usually accomplished by grinding a high softening point hydrocarbon to form very small particles (usually approximately 100 μm in size) and then, dispersing the solid particles in the liquid fuel. The dispersion of a solid in a liquid, however, usually results in the production of a fuel with unfavorable characteristics such as increased viscosity.

A novel method of economically utilizing a high softening point hydrocarbonaceous material (such as coal, coke, ROSE residual, etc.) is achieved by incorporating it into a pre-atomized fuel. This is accomplished by first grinding a material of high softening point to form very small particles (generally less than about 30 μm) and then forming a slurry by dispersing the particles in a continuous aqueous phase containing a pre-atomized fuel-compatible surfactant package.

The slurry of dispersed particles is mixed at an appropriate ratio with a pre-atomized fuel formulated from a hydrocarbon other than that used to form the slurry. The mixing of a slurry with a pre-atomized fuel results in a liquid fuel which has a viscosity lower than either the slurry or the pre-atomized fuel prior to mixing. The reasons for the reduced viscosity observed in a slurry/pre-atomized fuel mixture are not fully known; however, without wishing to be bound or restricted by any particular theory, applicants believe that the reduction of particle-to-particle interaction is a contributing factor.

6.4. Properties of Emulsan-Stabilized Hydrocarbosols

The hydrocarbon droplets of hydrocarbon-in-water emulsions generally rise to the surface and "float" on the aqueous phase in a process known as creaming, provided the density of the hydrocarbon phase is less than that of the aqueous phase and the droplets in the dispersed phase are too big to be stabilized by Brownian motion. If the "cream" remains undisturbed for a given period of time, the droplets coalesce, giving rise to two separate phases. The emulsans, particularly α-emulsan, are extremely effective in retarding coalescence and the emulsan-stabilized droplets in the "cream" are easily redispersible in the aqueous phase.

The principal factors controlling emulsion stability are electrostatic (charge) effects and steric effects. The properties of emulsans lend themselves to optimal exploitation of these mechanisms. Their large molecular weight and highly specific three-dimensional structure result in an efficient coverage of the hydrocarbon/water interface. This effectively prevents oil-to-oil contact when collisions occur between adjacent droplets. Simultaneously, the polyanionic nature of emulsans causes the surfaces of emulsion droplets to be negatively charged which creates repulsive forces and significantly decreases the collision frequency between hydrocarbon droplets. In addition, the absence of multimolecular emulsan micelles in the water phase and the lack of emulsan solubility in the hydrocarbon phase provides an efficient migration and attachment of the emulsan molecules to the oil/water interface. The overall chemical requirements for emulsion stabilization thus become very small and directly related to the oil droplet size, i.e., interfacial area desired.

6.5. Blending of Hydrocarbons

In some cases hydrocarbons may be too viscous for conventional processing or have characteristics (i.e., low gravity; excessive paraffinic, aromatic, and/or asphaltic contents; etc) which make them unfavorable to incorporate into stable pre-atomized fuels. One method to reduce viscosity for processing or alleviate unfavorable characteristics is blending the unfavorable hydrocarbon with one which is favorable resulting in a hydrocarbon having characteristics suitable for pre-atomized fuel formation. In this way an otherwise unusable hydrocarbon can be "adjusted" to a usuable form.

6.6. Reduction of Oxidized Sulfur Compound (SOX) Levels in Combustion Gases

6.6.1. High Sulfur Content Combustible Compounds

A large array of naturally occuring hydrocarbon and coal compositions contain appreciable quantities of sulfur (S) as contaminants. When, upon combustion, such fuels produce levels of oxidized sulfur compounds (SOX) in excess of the locally acceptable standard, such fuels are called "high sulfur content" fuels. These fuels cannot be burned in an environmentally acceptable manner without taking steps to reduce these SOX levels.

Combustible compounds which have high S content include, but are not limited to, coals, especially the softer or bituminous coals, and the heavier petroleum fractions such as heavy crude oils, asphalts, resids, bottoms, and tars (see sec. 6.2 supra.). Such compounds cannot be commercially used as fuels without reducing the SOX emissions. As the supply of the "clean burning" or low S fuels is diminished, it is anticipated that these high S fuels will become increasingly important as energy sources.

6.6.2. Solid Sulfur Sorbents

A wide array of inorganic and organic salts can be used as sulfur sorbents which result in SOX reduction in combustion gases (often, the SOX can be reduced to acceptable levels as defined by local regulatory standards thereby making the fuels "clean burning"). Such compounds react with the oxidized sulfur at some time during the combustion process to form the corresponding sulfates and sulfites. A particular advantage of reacting during the combustion process is that, at the high temperatures realized within and in the vicinity of flame, the sorbents become highly reactive species and the kinetics of the reaction strongly favor the binding of the SOX.

A major factor in determining the sorbent efficiency is the actual physical particle size, as only exposed surfaces will be reactive. As the particle size decreases, the surface area per unit mass of sorbent increases, causing the efficiency to increase. It is, therefore, desirable to achieve as small a particle size as practical.

Sorbents can be conveniently divided into two classes based on their water solubility: soluble sulfur sorbents and insoluble sulfur sorbents. The insoluble sulfur sorbents are generally the less expensive of the two, but their efficiency is usually not as great.

This low efficiency is due primarily to the fact that the particle size of the insoluble sorbents is determined by physical processes such as grinding. Thus, a practical limit exists for the minimum particle size and the efficiency is, therefore, also limited. The insoluble sorbents are generally found in abundance naturally and include the alkaline earth metal carbonates such as calcium carbonate ($CaCO_3$, limestone) and magnesium carbonate ($MgCO_3$). Minerals containing high quantities of these compounds such as dolomite (a mixture of $CaCO_3$ and $MgCO_3$) are also useful as sorbents. A primary criterion for the selection of an insoluble sorbent is that it be relatively inexpensive, since its efficiency will be low.

The soluble sorbents, on the other hand, are generally more expensive. Included in this category are calcium, sodium, and magnesium salts of formate, acetate, propionate and higher organic radicals. Another soluble sorbent, sodium carbonate (soda ash, $Na_2CO_3$) is much less expensive than any of the organic salts, but this compound suffers from the drawback of causing boiler fouling, greatly limiting its utility in commercial applications.

The soluble sorbents are generally much more efficient in reducing SOX emissions than the insoluble sorbents, particularly in fuels where water forms a significant component of the mixture, such as in coal/water slurries or preatomized fuels (where water is the continuous phase). In these compounds, it has been postulated that the dissolution of the soluble salts greatly reduces the effective particle size of the sorbent, which increases the efficiency. Since the particle size is not dependent on physical processes, the effective particle size can be much lower and the efficiency much higher than achievable with insoluble sorbents. The high cost of soluble sorbents, however, is a major drawback to their use.

6.6.3. Mixed Soluble/Insoluble Sorbent Packages

Admixtures of soluble and insoluble sorbents can be utilized to achieve highly efficient SOX reduction during combustion of high sulfur content fuels including preatomized fuels and coal/water slurries. These admixtures, it has been discovered, exhibit a remarkable reduction in SOX levels; in fact, the SOX reduction efficiency of the admixture exceeds the combined efficiency of each component separately. Apparently each component exerts a catalytic effect on the SOX absorbing ability of the other.

While not wishing to be bound by theory, applicants postulate that this effect arises from interactions between the soluble and insoluble absorbents both prior to and during the combustion which renders the insoluble species more reactive, enhancing the overall efficiency of the admixture. In this way, the benefit of the high efficiency of the soluble sorbents can be combined with the low cost of insoluble sorbents, making a efficient and cost-effective SOX reduction system.

In the admixtures themselves, the quantity of soluble sorbents required to achieve this effect is quite small, depending on the particular sorbents used. Generally, a concentration of soluble sorbent ranging from 0.5-20% (by weight) and, preferably, from 1-10% in the admixture will produce a reduction in SOX levels sufficient to meet the local environmental standards. Since the admixture greatly increases the SOX reduction efficiency as compared with either sorbent alone, the concentration of the admixture in the fuel can also be kept low, generally 0.5-25% (by weight). Thus, the amount of sorbent admixture used is quite low for the SOX reduction observed.

In one embodiment, an admixture of 90% $CaCO_3$ and 10% CaAc (calcium acetate) was found to exhibit a removal efficiency (a measurement of the theoretical SOX reducing capacity to the actual SOX reduction observed) of 31-44% for a sulfur-containing resid. Even when this amount is corrected for the presence of CaAc by assuming the CaAc reacted with sulfur with 100% efficiency, (a very conservative estimate since, alone, it exhibits a removal efficiency of 50%), the removal efficiency is still 26-40%, as compared with 9-19% observed with an equivalent amount of calcium carbonate as the only sorbent and making the comparison under similar operating conditions. Thus, the SOX reducing capacity is greatly enhanced by forming the admixture.

In another embodiment, the sorbent admixture can be added to coal, either in a water slurry or solid form, resulting in reduced SOX emissions. Since, as stated supra, large amount of coal reserves have high sulfur content, the invention permits the coal to be burned in an-environmentally acceptable manner.

Additionally, the use of these solid sorbent admixtures confers the benefit of permitting easy collection and removal of the bound sulfate and sulfite, since they are in the solid phase. In fact, when calcium sorbents are used, the result is $CaSO_4$ (gypsum) which is industrially useful. Thus, the potential for adverse environmental effects (due to waste disposal) is further reduced.

7. EXAMPLES

7.1. Preparation of Bioemulsifiers

7.1.1. Preparation of Technical Grade α-Emulsan

The α-emulsans produced by Acinetobacter calcoaceticus ATCC 31012 during fermentation on ethanol are known bioemulsifiers as described in U.S. Pat. No. 4,395,354, incorporated by reference supra. The α-emulsans used in the experiments described infra were technical grade materials (unless otherwise indicated) which were prepared in either of two ways. Both methods of preparation involved enzyme treatment and drying but differed in the order in which these steps were performed. By one method, centrifuged (approximately 90% cell-free) fermentation broth containing α-emulsans resulting from a fermentation of Acinetobacter calcoaceticus ATTCC 31012 in ethanol medium was drum-dried and the resulting material was treated in the following manner prior to use. A 10% by weight suspension of the material, so-called technical grade α-emulsan, was prepared in deionized water and heated to 50°-60° C. while continuously stirring. The pH of the suspension was adjusted to pH 8.5 by adding 50% by weight sodium hydroxide (diluted, if necessary). Protease enzyme (NOVO Industries, 1.5M Alcalase) was added at a level of 1 part protease:500 parts solid α-emulsan. The mixture was allowed to remain at 50°-60° C. while being stirred for about three hours. Reactions were run to completion as judged by the absence of visible precipitable emulsan following centrifugation of the reaction mixture. After completion of the enzyme treatment, the reaction mixtures were raised to approximately 70° C. to denature the protease and stop its activity. The solutions were cooled to room temperature and Cosan PMA-30 (Cosan Corporation), a preservative, was added at a level of 1 part Cosan:500 parts α-emulsan solution.

By another method, enzyme treatment of the α-emulsan was performed prior to drum drying according to the following protocol. Fermentation broth containing α-emulsan resulting from a fermentation of Acinetobacter calcoaceticus ATCC 31012 in ethanol medium was centrifuged to remove approximately 90% of the bacterial cells. To the centrifuged broth, protease enzyme (as previously described) was added in a ratio of 1 gram protease:500 units per milligram of Specific Emulsification Activity (where one unit per milligram of Specific Emulsification Activity is defined as that amount of emulsifying activity per milligram of bioemulsifier which yields 100 Klett absorption units using a standard hydrocarbon mixture consisting of 0.1 ml of 1:1 (v/v) hexadecane/2-methylnaphthalene and 7.5 ml of Tris-Magnesium buffer). The protease reaction was run to completion as described supra. The protease-treated centrifuged broth was then evaporated to a 10% (w/v) slurry of α-emulsan. The slurry was sprayed dried and the resulting material is also referred to as technical grade α-emulsan.

7.1.2. Additional Preparations of Acinetobacter Calcoaceticus Bioemulsifiers Fermentations of Acinetobacter calcoaceticus ATCC 31012 were run on ethanol as described in U.S. Pat. No. 4,395,354. The following fractions of the resulting broth were used to formulate surfactant packages: whole broth, supernatants, cells, enzyme-treated whole broth, enzyme-treated supernatants, enzyme-treated cells (where the enzyme treatment was as described for the second method in Section 7.1.1. supra), homogenized cells, boiled cells, and so-called "Millipore emulsan." Millipore emulsan is prepared by Millipore filtering whole broth to remove cells, followed by enzyme treatment (described supra) and ultrafiltration. The foregoing preparations were used in liquid or wet form. The Millipore emulsan samples can be further dialyzed against ammonium bicarbonate and freeze-dried prior to use in surfactant packages.

Whole broth and enzyme-treated whole broth from fermentations of Acinetobacter calcoaceticus ATCC 31012 on soap stock (run under conditions similar to those described in U.S. Pat. No. 4,230,801, incorporated by reference, supra) were also used.

Acinetobacter calcoaceticus NS-1 (NRRL B-15847) was grown in a fermentor on ethanol medium under conditions similar to those described in U.S. Pat. No. 4,395,354. Both whole broth and enzyme-treated whole broth were used to formulate surfactant packages.

Acinetobacter calcoaceticus strains NS-4 (NRRL B-15848), NS-5 (NRRL B-15849), NS-6 (NRRL B-15860) and NS-7 (NRRL B-15850) were grown for 3 days in shake flask cultures in 2% ethanol medium as described in U.S. Pat. No. 4,395,354. Enzyme-treated whole broth samples were prepared from the NS-4, NS-5 and NS-7 cultures. Enzyme-treated supernatant samples were prepared from NS-4, NS-5, NS-6 and NS-7 cultures. These preparations were also used to formulate surfactant packages.

7.2. Hydrocarbon Characteristics

7.2.1. Boscan Crude Oil

Boscan crude oil is a heavy crude produced from the oilfields of western Venezuela. The characteristics of the crude, its specific gravity, API gravity (°API), paraffin content (% by weight), aromatic content (% by weight), asphaltene content (% by weight) and viscosity (in centipoise) versus temperature (degrees Fahrenheit) profile, were determined experimentally and are summarized in Table VII. The paraffin, aromatic, sulfur and asphaltene content were determined by the methods described in Section 7.2.3.

TABLE VII

BOSCAN CRUDE OIL CHARACTERISTICS

| | | |
|---|---|---|
| Specific Gravity | = | 0.983 |
| API Gravity (calculated) | = | 12.5° API |
| Paraffin content | = | 18.0% (w/w) |
| Aromatic content | = | 60.0% (w/w) |
| Asphaltene content | = | 22.0% (w/w) |
| Sulfur content | = | 5.8% (w/w) |

| Viscosity (cp) | Temperature (° F.) |
|---|---|
| 4,500 | 140 |
| 24,000 | 100 |
| 192,000 | 60 |

7.2.2. Ex-Flasher

Ex-Flasher is a vacuum bottom resid having a softening point of 70°–90° F. The characteristics of the crude, its specific gravity, API gravity (°API) paraffin content (% by weight), aromatic content (% by weight), asphaltene content (% by weight) and viscosity (in centipoise) versus temperature (degrees Fahrenheit) profile, were determined experimentally and are summarized in Table VIII. The paraffin, aromatic, sulfur and asphaltene content were determined by the methods described in Section 7.2.3.

TABLE VIII

EX-FLASHER CHARACTERISTICS

| | | |
|---|---|---|
| Specific Gravity | = | 1 |
| API Gravity (calculated) | = | 9.3° API |
| Paraffin content | = | 24.9% (w/w) |
| Aromatic content | = | 64.6% (w/w) |
| Asphaltene content | = | 10.5% (w/w) |
| Sulfur content | = | 3.4% (w/w) |

| Viscosity (CPS) | Temp (°F.) |
|---|---|
| 64,000 | 118 |
| 33,000 | 128 |
| 20,000 | 138 |
| 14,000 | 148 |
| 9,000 | 158 |
| 4,100 | 168 |
| 2,000 | 179 |
| 1,800 | 189 |
| 950 | 196 |
| 900 | 199 |
| 640 | 211 |
| 500 | 220 |

7.2.3. Methods for Determining Hydrocarbon Characteristics, Including Asphaltene Content Viscosity versus temperature profiles were obtained by heating the oils to temperatures given in the tables VII–XIII and measuring viscosities in a Rheomat 30 rheometer (Contraves AG), at an approximate shear rate of 30 sec.$^{-1}$.

The paraffin, asphaltene and aromatic contents of the sample hydrocarbons were obtained by a method in which the hydrocarbons are dispersed in n-heptane, the asphaltenes removed by filtration and the remaining components separated based in their solubilities in n-heptane and methylene chloride. The asphaltene fraction (the precipitate) is filtered from a dispersion of the hydrocarbon in n-heptane. The paraffin fraction is that portion soluble in n-heptane. The aromatic fraction is that portion soluble in methylene chloride, but not in n-heptane.

The materials used are as follows: an analytical balance, accurate to 0.1 milligram (mg), a blender (Osterizer Galaxy 14) and blades fitted to a 500 ml Mason jar, preweighed Whatman #1 paper, filter funnel, rotary evaporation apparatus, a 500 millimeter (mm) burette-type chromatography column, tared collection flasks, reagent grade methylene chloride, n-heptane (99 mole percent) and alumina adsorbent. The alumina was activated by heating it in an oven at 310° C. for 12–14 hours. The alumina was cooled in a dessicator and stored in a tightly capped bottle prior to use. Chromatography columns packed ¾ full were used.

Hydrocarbon samples of 1–2 g were quantitatively added to Mason jars containing 100 ml of n-heptane. After blending for 1–2 minutes at maximum speed, the jar and its contents were washed with an additional 100 ml of n-heptane. The dispersed sample was filtered through Whatman #1 paper and the filtrate collected into Erlenmeyer flasks. After introduction of the filtrate to the column, the effluent was collected into a tared evaporation flask. When n-heptane was completely eluted, 200 ml of methylene chloride was added to the column and the eluted material collected into another tared evaporation flask until the column ran dry.

The eluting solvents were removed using a rotating vacuum evaporator at temperatures appropriate to the solvents.

The tared filter paper and flasks were reweighed and the percentage of asphaltenes, paraffins, and aromatics were calculated based on the original weight of the sample. Individual samples were run in duplicate. All percentages apearing in the foregoing tables for paraffinic, aromatic and asphaltene content have been adjusted to 100% recovery for comparative purposes.

Sulfur content was assayed by a quantitative assay on a Leco sulfur analyzer.

7.2.4. Preatomized Fuels

Applicants, in U.S. Pat. No. 4,618,348, issued October 21, 1986, presented examples detailing procedures for forming preatomized fuels and the properties of the resultant preatomized fuels. These examples are incorporated herein by reference.

7.3. Oxidized Sulfur Compound Reduction Experiments

7.3.1. Furnace Assembly and Instrumentation

The SOX reduction combustion tests were run in a Cleaver-Brooks 15 MM Btu/hr fire tube hot water boiler furnace equipped with instrumentation for operating condition monitoring. Access to the fire chamber is also provided for radiation and temperature measurements.

The furnace fuel intake line is equiped with a Micro-Motion model C50 mass flow meter which can accurately measure fuel flow independent of viscosity. Just downstream of this meter, instrumentation which monitors fuel temperature and pressure is present, providing a continuous record of these parameters during operation.

Furnace exhaust gases are continuously monitored using a Perkin-Elmer Multiple Gas Analyzer (MGA) model 1200, a mass spectrometer which continuously samples and monitors the exhaust for $N_2$, $O_2$, $SO_2$, $H_2O$, and $CO_2$. The assembly is also equipped with instrumentation which can monitor CO, NOX, and particulates within the exhaust gases.

The same boiler load (heat output of the boiler relative to its maximum rated capacity) or fuel input (on a Btu basis) was used for each series of tests. All other boiler conditions were maintained as stable as possible during each test. The design of the Cleaver-Brooks boiler system is such that the atomization air flow is relatively constant for all firing rates. Therefore, the atomizing air/fuel ratio will decrease as the fuel is increased, resulting in richer fuel/air mixtures being burned, and the air/fuel ratio will increase as the fuel is decreased, resulting in leaner fuel/air (excess $O_2$) mixtures being burned.

7.3.2. Determination of $SO_2$ Removal Efficiency

Sulfur dioxide $SO_2$ removal efficiency is determined by measuring the baseline $SO_2$ concentration from produced by fuel being examined using the Perkin-Elmer Multiple Gas Analyzer. Comparisons were then made with the $SO_2$ emissions observed during combustion the fuel containing various sulfur sorbents. For these comparisons, all $SO_2$ concentrations were corrected to the "equivalent" concentration which would be observed if the excess $O_2$ in the burner was 3%, using the following conversion:

$$SO_2 \text{ (at 3\%} O_2\text{)} = SO_2 / \left(1 - \frac{[O_2] - 3}{18}\right)$$

where $[SO_2]$ is the observed $SO_2$ concentration and $[O_2]$ is the excess concentration of oxygen (i.e. that above the ambient air concentration), both in volume precent.

In this way, the effect of varying $O_2$ concentration is negated, and the results of the separate experimental series can be directly compared.

The percent of $SO_2$ reduction observed when a sorbent additive is present, called % removal, is calculated by the following formula:

$$\% \text{ Removal} = \frac{[SO_2] \text{ Baseline} - [SO_2] \text{ Sorbent} \times 100}{[SO_2] \text{ Baseline}}$$

where $[SO_2]$ is the observed $SO_2$ concentration for each fuel or fuel/sorbent mixture at each condition examined.

The removal efficiency (% RE) is determined by calculating the ratio of the (observed) % removal/the theoretical sulfur binding capacity of the sorbent (assuming it reacted stoichiometrically) and dividing this number by the % sulfur in the fuel, i.e.:

$$\% RE = \frac{\% \text{ Removal}/\% \text{ S stoich}}{\% \text{ S fuel}}$$

For example, if 30% sulfur dioxide removal was observed, the fuel contained 3.33% sulfur and amount of sorbent added could theoretically remove 2% of this sulfur, then:

$$\% RE = \frac{30\%/2}{3.33} = 50\% \text{ Removal}$$

7.3.3. Profile of Test Preatomized Fuel

Ex-Flasher (see section 7.2.2. supra) was tested as preatomized fuel having a 70/30 hydrocarbon to water ratio. The aqueous phase contains 0.125% of Kelco K1A112 biopolymer and a surfactant package, is present at a level of 1/250 parts oil. The surfactant package is comprised of the following:

| Material | % |
|---|---|
| Pluronic F-38 | 47.24 |
| Tergitol NP-40 | 21.38 |
| Iconol DNP-150 | 21.38 |
| Basified Indulin AT | 10.00 |

Once the preatomized fuel is prepared, 500 ppm (to the aqueous phase) formaldehyde is added to prevent microbial degradation.

The prior noted trade named products correspond to the following:

(1) Kelco K1A112 biopolymer is the heteropolysaccharide S-194 produced by Alcaligenes sp. ATCC 31961 as described in U.S. Pat. No. 4,401,760;

(2) Pluronic F-38 is a polyoxypropylene-polyoxyethylene block copolymer in prill form having a hydrophilic-lipophilic balance of about 30.5;

(3) Tergitol NP-40 is a nonylphenol polyethylene glycol ether having an average molecular weight of 1980 atomic mass units (abbreviated herein as "amu");

(4) Iconol DNP-150 is a dinonylphenol ethoxylate having an average molecular weight of 6900 amu; and (5) Basified Indulin AT is a purified free acid pine lignin.

In triplicate combustion experiments, the following parameters were found:

TABLE IX

| Fuel | % Sulfur[1] Analysis | % Sulfur[1] Theoretical | % $SO_2$ at 3% $O_2$[2] Actual | % $SO_2$ at 3% $O_2$[2] Analysis |
|---|---|---|---|---|
| EX-FLASHER | 3.40 | 3.64 | 1937 | 1811 |
| EX-FLASHER | 3.40 | 3.70 | 1971 | 1811 |

TABLE IX-continued

| | % Sulfur[1] | | % $SO_2$ at 3% $O_2$[2] | |
|---|---|---|---|---|
| Fuel | Analysis | Theoretical | Actual | Analysis |
| EX-FLASHER | 3.40 | 3.36 | 1791 | 1811 |

[1]The "analysis" % was measured by a quantitative S-assay prior to combustion; the "theoretical" % was calculated from the measured $SO_2$ observed during combustion.
[2]The actual % was measured by the MGA during combustion; the "analysis" % is calculated based on the % S obtained in the analysis assuming 100% conversion to $SO_2$.

7.3.4. Use of Limestone as a Sorbent

Limestone, $CaCO_3$ (Pfizer, Inc. Marblewhite 325, a natural source fire-grind limestone), was added to the fuel in two concentrations, which if reacted stoichiometrically with the sulfur, would have reduced the sulfur in the fuel 1 and 2 percent respectively. The results of the $SO_2$ measurement observed during the furnace combustion are prsented in Table X.

TABLE X

Results of Limestone Sorbent Tests

| FUEL | SORBENT | AMOUNT | EXCESS $O_2$ | BOILER LOAD | $SO_2$ (3% $O_2$) | % REMOV | % R EFF |
|---|---|---|---|---|---|---|---|
| EX-FLASHER | $CaCO_3$ | 1 | 3.2 | 49 | 1804 | 5 | 16 |
| | | 1 | 3.8 | 49 | 1744 | 8 | 26 |
| | | 1 | 5.7 | 49 | 1744 | 8 | 26 |
| | | 1 | 1.0 | 27 | 1839 | 3 | 9 |
| | | 1 | 2.1 | 27 | 1818 | 4 | 13 |
| | | 1 | 8.9 | 28 | 1749 | 8 | 26 |
| EX-FLASHER | $CaCO_3$ | 2 | 1.0 | 51 | 1805 | 5 | 8 |
| | | 2 | 2.3 | 51 | 1760 | 7 | 11 |
| | | 2 | 3.5 | 51 | 1724 | 9 | 14 |
| | | 2 | 5.8 | 51 | 1710 | 10 | 16 |
| | | 2 | 2.1 | 28 | 1776 | 6 | 9 |
| | | 2 | 2.9 | 28 | 1745 | 8 | 13 |
| | | 2 | 3.9 | 29 | 1722 | 9 | 14 |
| | | 2 | 4.4 | 28 | 1706 | 10 | 16 |
| | | 2 | 5.9 | 27 | 1668 | 12 | 19 |

As shown, the removal efficiency was higher with the lower amount of $CaCO_3$. Also, the reaction of sorbent with sulfur dioxide is dependent on the temperature profile (load) in the furnace, being more efficient at loewr loads. This is not unexpected since, as temperature increases, the surfaces of the sorbents may fuse, reducing the available surface at which the SOX absorbing reactions can occur. The effects of these parameters are graphically presented in FIG. 1.

7.3.5. Use of Limestone/Soda Ash Admixtures as Sorbents

Figure 2:
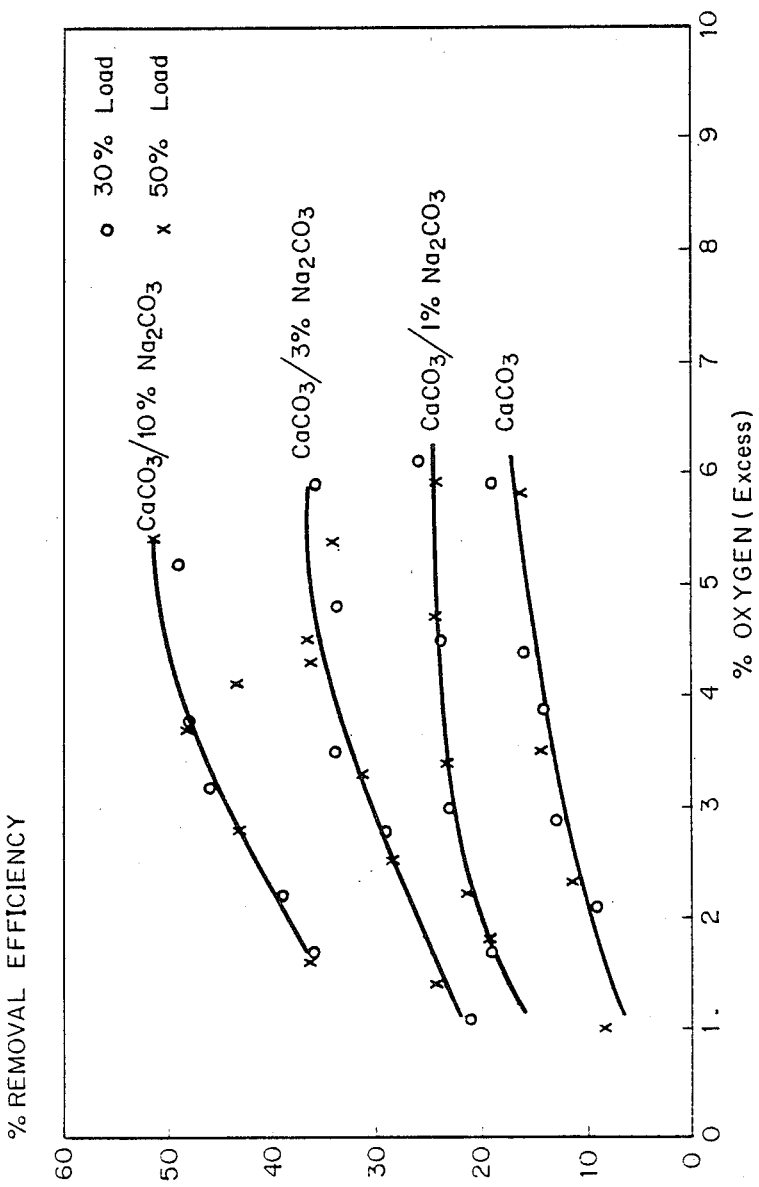
FIG. 2 is a graphical representation of the Removal Efficiency as a function of the % excess oxygen for three $CaCO_3/Na_2CO_3$ S sorbent systems at 30 and 50% furnace loads.

This series of experiments examined the effect of using limestone ($CaCO_3$)/soda ash ($Na_2CO_3$) admixtures as sulfur sorbents. The soda ash was mixed with the limestone at 3 levels, 1, 3, and 10% by weight. The results are presented in Table XI and, also, graphically presented in FIG. 2.

TABLE XI

Results of $CaCO_3/Na_2CO_3$ Sorbent Tests

| FUEL | SORBENT | AMT. | EXCESS O2 | BOILER LOAD | SO2 (3% $O_2$) | % R EFF | RE—Na | |
|---|---|---|---|---|---|---|---|---|
| EX-FLASHER | CaCO3/ 1% Na2CO3 | 2 | 1.8 | 51 | 1666 | 12 | 19 | 19 |
| | | 2 | 2.2 | 51 | 1652 | 13 | 21 | 21 |
| | | 2 | 3.0 | 51 | 1581 | 16 | 26 | 27 |
| | | 2 | 3.4 | 51 | 1637 | 14 | 23 | 22 |
| | | 2 | 4.7 | 51 | 1605 | 15 | 24 | 25 |
| | | 2 | 5.9 | 51 | 1610 | 15 | 24 | 24 |
| | | 2 | 1.7 | 31 | 1670 | 12 | 19 | 19 |
| | | 2 | 3.0 | 30 | 1625 | 14 | 23 | 23 |
| | | 2 | 4.5 | 30 | 1601 | 15 | 24 | 25 |
| | | 2 | 6.1 | 30 | 1599 | 16 | 26 | 25 |
| EX-FLASHER | CaCO3/ 3% Na2CO3 | 2 | 1.4 | 50 | 1607 | 15 | 24 | 22 |
| | | 2 | 2.5 | 51 | 1579 | 17 | 28 | 25 |
| | | 2 | 3.3 | 51 | 1542 | 19 | 31 | 28 |
| | | 2 | 4.3 | 51 | 1472 | 22 | 36 | 34 |
| | | 2 | 4.5 | 50 | 1480 | 22 | 36 | 34 |
| | | 2 | 5.4 | 50 | 1489 | 21 | 34 | 33 |
| | | 2 | 1.1 | 30 | 1653 | 13 | 21 | 18 |
| | | 2 | 2.8 | 29 | 1545 | 18 | 29 | 28 |
| | | 2 | 3.5 | 30 | 1490 | 21 | 34 | 33 |
| | | 2 | 4.8 | 30 | 1502 | 21 | 34 | 32 |
| | | 2 | 5.9 | 30 | 1480 | 22 | 36 | 34 |
| EX-FLASHER | CaCO3/ 10% Na2CO3 | 2 | 1.6 | 53 | 1472 | 22 | 36 | 28 |
| | | 2 | 2.8 | 52 | 1405 | 26 | 43 | 34 |
| | | 2 | 3.7 | 54 | 1343 | 29 | 48 | 40 |
| | | 2 | 4.1 | 51 | 1395 | 26 | 47 | 35 |
| | | 2 | 5.4 | 53 | 1313 | 31 | 51 | 43 |
| | | 2 | 1.7 | 30 | 1469 | 22 | 36 | 28 |
| | | 2 | 2.2 | 30 | 1438 | 24 | 39 | 31 |
| | | 2 | 3.2 | 30 | 1359 | 28 | 46 | 39 |
| | | 2 | 3.8 | 29 | 1347 | 29 | 48 | 40 |

TABLE XI-continued

Results of CaCO3/Na2CO3 Sorbent Tests

| FUEL | SORBENT | AMT. | EXCESS O2 | BOILER LOAD | SO2 (3% O2) | % R EFF | RE—Na |
|------|---------|------|-----------|-------------|-------------|---------|-------|
|      |         | 2    | 5.2       | 29          | 1318        | 30      | 49    | 43 |

The results, compared at three percent oxygen, show a significant improvement in removal efficiency as the percent of sodium carbonate is increased. A comparison of removal rates for the various sodium carbonate additions shows a moderate dependence on excess oxygen and no dependence on boiler load.

By subtracting the effects of the sodium carbonate, i.e., reducing the baseline sulfur dioxide level by the amount of sulfur the sodium carbonate would remove (assuming 100% of removal efficiency) interesting results were obtained, as shown in the final column. A marked improvement in removal efficiency as the percent $Na_2CO_3$ was increased. This is clearly a catalytic effect, since the absorbance due to the $Na_2CO_3$ was corrected for. Apparently, $Na_2CO_3$ exerts a synergestic effect on the absorbing capacity of the $CaCO_3$.

7.3.6. Use of Calcium Acetate as a Sorbent

This series of experiments examined the effectiveness of calcium acetate (CaAc) as a sulfur sorbent. Since CaAc is water soluble, the "particle" size of the dissolved calcium sorbent is not dependent on the initial grinding. Thus, the effective particle size is quite small, and the material, therefore, a more effective sorbent.

The results of a series of tests confirmed this, the results for which are shown in Table XII.

TABLE XII

Results of CaAc Sorbent Tests

| FUEL | SORBENT | AMOUNT | EXCESS O2 | BOILER LOAD | SO2 | (3%) | % REMOV |
|------|---------|--------|-----------|-------------|------|------|---------|
| EX-FLASHER | CaAc | 2 | 2.2 | 49 | 1337 | 29 | 48 |
|  |  | 2 | 3.1 | 49 | 1326 | 30 | 49 |
|  |  | 2 | 4.0 | 48 | 1285 | 32 | 53 |
|  |  | 2 | 5.1 | 48 | 1263 | 33 | 54 |
|  | CaAc | 2 | 2.2 | 28 | 1246 | 34 | 56 |
|  |  | 2 | 3.3 | 28 | 1210 | 36 | 59 |
|  |  | 2 | 4.2 | 28 | 1167 | 38 | 63 |
|  |  | 2 | 5.4 | 28 | 1125 | 40 | 66 |
|  |  | 2 | 5.9 | 28 | 1120 | 41 | 68 |

As shown, in tests performed at 30 and 50% loads, the CaAc sorbent demonstrated a 48-54% and a 56-68% removal efficiency, respectively.

7.3.7. Use of Limestone/CaAc Mixtures as Sorbents

Figure 3:
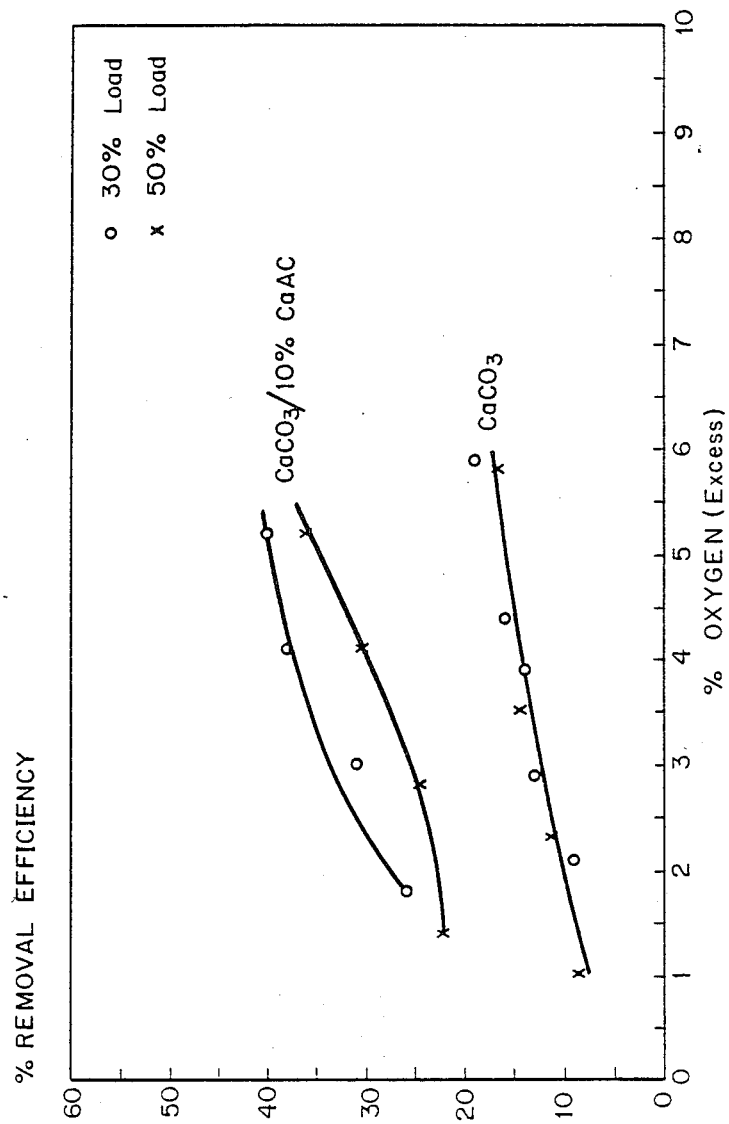
FIG. 3 is a graphical representation of the Removal Efficiency as a $CaCO_3/10\%$ calcium acetate sorbent system at a 30 and 50% furnace load.

Because of the superior sorbent ability of CaAc observed in example 7.3.6., a series of experiments using limestone mixed with 10% CaAc was conducted. The results are presented in Table XIII, and graphically presented in FIG. 3.

TABLE XIII

Results of CaCO3/CaAc Sorbent Tests

| FUEL | SORBENT | AMOUNT | EXCESS O2 | BOILER LOAD | SO2 | 2 (3%) | % REMOV | % RE—% R EFF |
|------|---------|--------|-----------|-------------|------|--------|---------|--------------|
| EX-FLASHER | CaCO3/ | 2 | 1.4 | 51 | 1584 | 16 | 26 | 22 |
|  | 10% CaAc | 2 | 2.8 | 51 | 1561 | 18 | 29 | 24 |
|  |  | 2 | 4.1 | 51 | 1495 | 21 | 34 | 30 |
|  |  | 2 | 5.2 | 52 | 1429 | 24 | 39 | 36 |
|  |  | 2 | 5.4 | 51 | 1422 | 25 | 41 | 36 |
|  |  | 2 | 1.8 | 29 | 1534 | 19 | 31 | 26 |
|  |  | 2 | 3.0 | 29 | 1484 | 22 | 36 | 31 |
|  |  | 2 | 4.1 | 29 | 1409 | 25 | 41 | 38 |
|  |  | 2 | 5.2 | 29 | 1384 | 27 | 44 | 40 |

[1]Re—CaAc numbers provide the calcium utilization efficiency, assuming that all the CaAc present is utilize at 100% Stoichiometric efficiency.

Although not quite as effective as the sodium carbonate, the SO2 removal efficiency of the limestone was doubled, even after correction for the CaAc, and assuming 100% efficiency for the CaAc (a very conservative assumption). This is significant since this sorbent combination will not have the problems with corrosion and/or fouling that might be experienced with the limestone/10% sodium carbonate combination.

It is apparent that many modifications and variations of this invention as hereinabove set forth may be made without departing from the spirit and scope thereof. The specific embodiments described are given by way of example only, and the invention is limited only by the terms of the appended claims.

What is claimed is:

1. An improved method for reducing SOX emissions during combustion of a sulfur-containing combustible material wherein the improvement comprises adding to said combustible material, prior to combustion, 0.5-25% by weight of an admixture of 80.99.5% by weight insoluble sulfur sorbent and 0.5-2.0% by weight soluble sulfur sorbent.

2. The method of claim 1 wherein the insoluble sulfur sorbent is an alkaline earth metal carbonate.

3. The method of claim 2 wherein the alkaline metal carbonate is calcium carbonate.

4. The method of claim 2 wherein the alkaline earth metal carbonate is magnesium carbonate.

5. The method of claim 2 wherein the alkaline earth metal carbonate is dolomite.

6. The method of claim 1 wherein the soluble sulfur sorbent is selected from the group consisting of sodium carbonate, sodium acetate, sodium formate, sodium propionate, calcium acetate, calcium formate, calcium propionate, magnesium acetate, magnesium formate, and magnesium propionate.

7. The method of claim 1 wherein the combustible material is a preatomized fuel formed from a sulfur-containing hydrocarbon.

8. The method of claim 1 wherein the combustible material is a sulfur-containing coal.

9. The method of claim 1 wherein the combustible material is a sulfur-containing coal-in-water slurry.

10. The method of claim 1 wherein the combustible material is a sulfur-containing hydrocarbon oil.

11. An improved method for reducing SOX emissions during combustion of a sulfur-containing hydrocarbon wherein the improvement comprises the precombustion steps of:
   a. emulsifying the hydrocarbon in water to form a preatomized fuel, and
   b. adding to said preatomized fuel 0.5–25% by weight of an admixture of 80.99.5.% by weight insoluble sulfur sorbent and 0.5–20% soluble sulfur sorbent.

12. The method of claim 11 wherein the insoluble sulfur sorbent is an alkaline earth metal carbonate.

13. The method of claim 12 wherein the alkaline earth metal carbonate is calcium carbonate.

14. The method of claim 12 wherein the alkaline earth metal carbonate is magnesium carbonate.

15. The method of claim 12 wherein the alkaline earth metal carbonate is dolomite.

16. The method of claim 11 wherein the soluble sulfur sorbent is selected from the group consisting of sodium carbonate, sodium acetate, sodium formate, sodium propionate, calcium acetate, calcium formate, calcium propionate, magnesium acetate, magnesium formate, and magnesium propionate.

17. The method of claim 11 wherein the sulfur-containing hydrocarbon is a viscous crude oil.

18. The method of claim 11 wherein the sulfur-containing hydrocarbon is a viscous vacuum resid.

19. The method of claim 11 wherein the sulfur-containing hydrocarbon is a viscous visbreaker resid.

20. The method of claim 11 wherein the sulfur-containing hydrocarbon is a viscous catalytic hydrogenated resid.

21. The method of claim 11 wherein the sulfur-containing hydrocarbon is a viscous cutback tar.

22. The method of claim 11 wherein the sulfur-containing hydrocarbon is a viscous pyrolysis pitch.

23. The method of claim 11 wherein the sulfur-containing hydrocarbon is a viscous propane deasphalted tar.

24. The method of claim 11 wherein the sulfur-containing hydrocarbon is viscous ROSE bottoms.

25. The method of claim 11 wherein the sulfur-containing hydrocarbon is a viscous Boscan Crude Oil.

26. A clean-burning fuel which produces low SOX emissions when burned which comprises a sulfur-containing combustible material and 0.5–25% by weight admixture of 80.99.5% by weight insoluble sulfur sorbent and 0.5–20% by weight soluble sulfur sorbent.

27. The fuel of claim 26 wherein the insoluble sulfur sorbent is an alkaline earth metal carbonate.

28. The fuel of claim 27 wherein the alkaline earth metal carbonate is calcium carbonate.

29. The fuel of claim 27 wherein the alkaline earth metal carbonate is magnesium carbonate.

30. The fuel of claim 27 wherein the alkaline earth metal carbonate is dolomite.

31. The fuel of claim 26 wherein the soluble sulfur sorbent is selected from the group consisting of sodium carbonate, sodium acetate, sodium formate, sodium propionate, calcium acetate, calcium formate, calcium propionate, magnesium acetate, magnesium formate, and magnesium propionate.

32. The fuel of claim 26 wherein the combustible hydrocarbon is a sulfur-containing hydrocarbon oil.

33. The method of claim 26 wherein the fuel is a sulfur-containing coal-in-water slurry.

34. A clean-burning fuel which produces low SOX emissions when burned, comprising a preatomized fuel, formed from a viscous sulfur-containing hydrocarbon and 0.5–25% by weight admixture of 80.99.5% by weight insoluble sulfur sorbent and 0.5–20% by weight soluble sulfur sorbent.

35. The fuel of claim 34 wherein the insoluble sulfur sorbent is an alkaline earth metal carbonate.

36. The fuel of claim 35 wherein the alkaline earth metal carbonate is calcium carbonate.

37. The fuel of claim 35 wherein the alkaline earth metal carbonate is magnesium carbonate.

38. The fuel of claim 35 wherein the alkaline earth metal carbonate is dolomite.

39. The fuel of claim 34 wherein the soluble sulfur sorbent is selected from the group consisting of sodium carbonate, sodium acetate, sodium formate, sodium propionate, calcium acetate, calcium formate, calcium propionate, magnesium acetate, magnesium formate, and magnesium acetate.

40. The fuel of claim 34 wherein the viscous hydrocarbon is a sulfur-containing crude oil.

41. The fuel of claim 34 wherein the viscous hydrocarbon is a sulfur-containing vacuum resid.

42. The fuel of claim 34 wherein the viscous hydrcarbon is a sulfur-containing visbreaker resid.

43. The fuel of claim 34 wherein the viscous hydrocarbon is a sulfur-containing catalytic hydrogenated resid.

44. The fuel of claim 34 wherein the viscous hydrocarbon is a sulfur-containing cutback tar.

45. The method of claim 34 wherein the viscous hydrocarbon is a sulfur-containing pyrolysis pitch.

46. The method of claim 34 wherein the viscous hydrocarbon is a sulfur-containing propane deasphalted tar.

47. The method of claim 34 wherein the viscous hydrocarbon is sulfur-containing ROSE bottoms.

48. The method of claim 34 wherein the viscous hydrocarbon is a sulfur-containing Boscan Crude Oil.

49. A clean-burning fuel which produces low SOX emissions when burned which comprises
   a. about 90 to about 99% of a combustible preatomized fuel formed by emulsifying a vacuum bottom resid with water in a 70/30 ratio using 0.125% heteropolysaccharide biopolymer S-194 produced by Alcaligenes sp. ATCC 31961 and 1/250 parts oil of a surfactant package comprising 47.24% polyoxypropylene-polyoxyethylene block copolymer in prill form having a hydrophilic-lipophilic balance of about 30.5, 21.38% nonylphenol polyethylene glycol ether having an average molecular weight of 1980 amu, 21.38% dinonylphenol ethoxylate having an average molecular weight of 6900 amu and 10% purified free acid pine lignin; and b. about 1 to about 10% of an admixture comprising about 90 to about 99% $CaCO_3$ and about 1 to about 10% $Na_2CO_3$.

50. A clean-burning fuel which produces low SOX emissions when burned which comprises:

a. about 90 to about 99% of a combustible preatomized fuel formed by emulsifying a vacuum bottom resid with water in a 70/30 ratio using 0.125% heteropolysaccharide biopolymer S-194 produced by Alcaligenes sp. ATCC 31961 and 1/250 parts oil of a surfactant package comprising 47.24% polyoxypropylene-polyoxyethylene block copolymer in prill form having a hydrophilic-lipophilic balance of about 30.5, 21.38% nonylphenol polyethylene glycol ether having an average molecular weight of 1980 amu, 21.38% dinonylphenol ethoxylate having an average molecular weight of 6900 amu and 10% purified free acid pine lignin; and b. about 1 to about 10% of an admixture comprising about 90 to about 99% $CaCO_3$ and about 1 to about 10% calcium acetate.

* * * * *

UNITED STATES PATENT AND TRADEMARK OFFICE
CERTIFICATE OF CORRECTION

PATENT NO. : 4,886,519

DATED : December 12, 1989

INVENTOR(S) : Michael E. Hayes, Kevin R. Hrebenar, Jennifer L. Minor and Lawrence M. Woodworth It is certified that error appears in the above-identified patent and that said Letters Patent is hereby corrected as shown below:

In column 30, line 44, in claim 1, "80.99.5%" should be --80-99.5%--.

In column 31, line 23, in claim 11, "80.99.5.%" should be --80-99.5%--.

In column 31, line 63, in claim 26, "80.99.5%" should be --80-99.5%--.

In column 32, line 18, in claim 34, "80.99.5%" should be --80-99.5%--.

Signed and Sealed this

Twenty-third Day of July, 1991

Attest:

HARRY F. MANBECK, JR.

*Attesting Officer*  *Commissioner of Patents and Trademarks*